United States Patent [19]

Moore

[11] Patent Number: 4,794,686
[45] Date of Patent: Jan. 3, 1989

[54] FLEXIBLE MACHINING SYSTEM

[75] Inventor: L. Bruce Moore, Moline, Ill.

[73] Assignee: Machine Research Company, Inc., Rock Island, Ill.

[21] Appl. No.: 31,426

[22] Filed: Mar. 26, 1987

[51] Int. Cl.$^4$ .................. B23Q 3/157; B23Q 41/02
[52] U.S. Cl. ........................... 29/568; 29/33 P; 29/563
[58] Field of Search .............. 29/568, 26 A, 26 R, 29/563, 564, 39, 50, 33 P; 409/158; 198/341, 345, 358, 346.1; 414/676, 749, 750

[56] References Cited

U.S. PATENT DOCUMENTS

| | | | |
|---|---|---|---|
| 3,986,617 | 10/1976 | Blomquist | 29/563 X |
| 4,216,572 | 8/1980 | Matsushita et al. | 29/568 |
| 4,309,600 | 1/1962 | Perry et al. | 29/33 P |
| 4,354,306 | 10/1982 | Ida et al. | 29/568 |
| 4,482,043 | 11/1984 | Bauman et al. | 29/33 P |
| 4,494,282 | 1/1985 | Ida et al. | 29/33 P |
| 4,498,571 | 2/1985 | Nomura et al. | 29/33 P |
| 4,503,596 | 3/1985 | Ida et al. | 29/568 |
| 4,512,068 | 4/1985 | Piotrowski | 29/563 |

FOREIGN PATENT DOCUMENTS 8204414 12/1982 PCT Int'l Appl. ............... 409/158

Primary Examiner—William R. Briggs
Attorney, Agent, or Firm—Lockwood, Alex, FitzGibbon & Cummings

[57] ABSTRACT

A machining system for simultaneously performing a number of machining operations on one face of a plurality of work pieces which are carried on a pallet is disclosed. The machining system includes a track having a pallet loading station and a pallet unloading station juxtaposed to the track, and at least one machining station juxtaposed to the track at a location between the loading and unloading stations. A plurality of pallets are supported for movement along the track between the unloading and loading stations and passed the machining station. Each pallet is set up for mounting at least one work piece in a predetermined position thereon. The system also includes a series of mechanisms for moving the pallet along the track, a mechanism for locating and securing each pallet in a predetermined location at the machining station. Additionally, the system has a mechanism for sequentially rotating each pallet through a plurality of positions once it is located and secured at each machining station whereby different surfaces of work pieces mounted thereon are selectively presented to tools on the machining station for machining thereof and a mechanism at each machining station for producing relative movement between the pallet and the work station. The machining station is provided with a plurality of machine heads mounted on a rotatable turret.

8 Claims, 24 Drawing Sheets

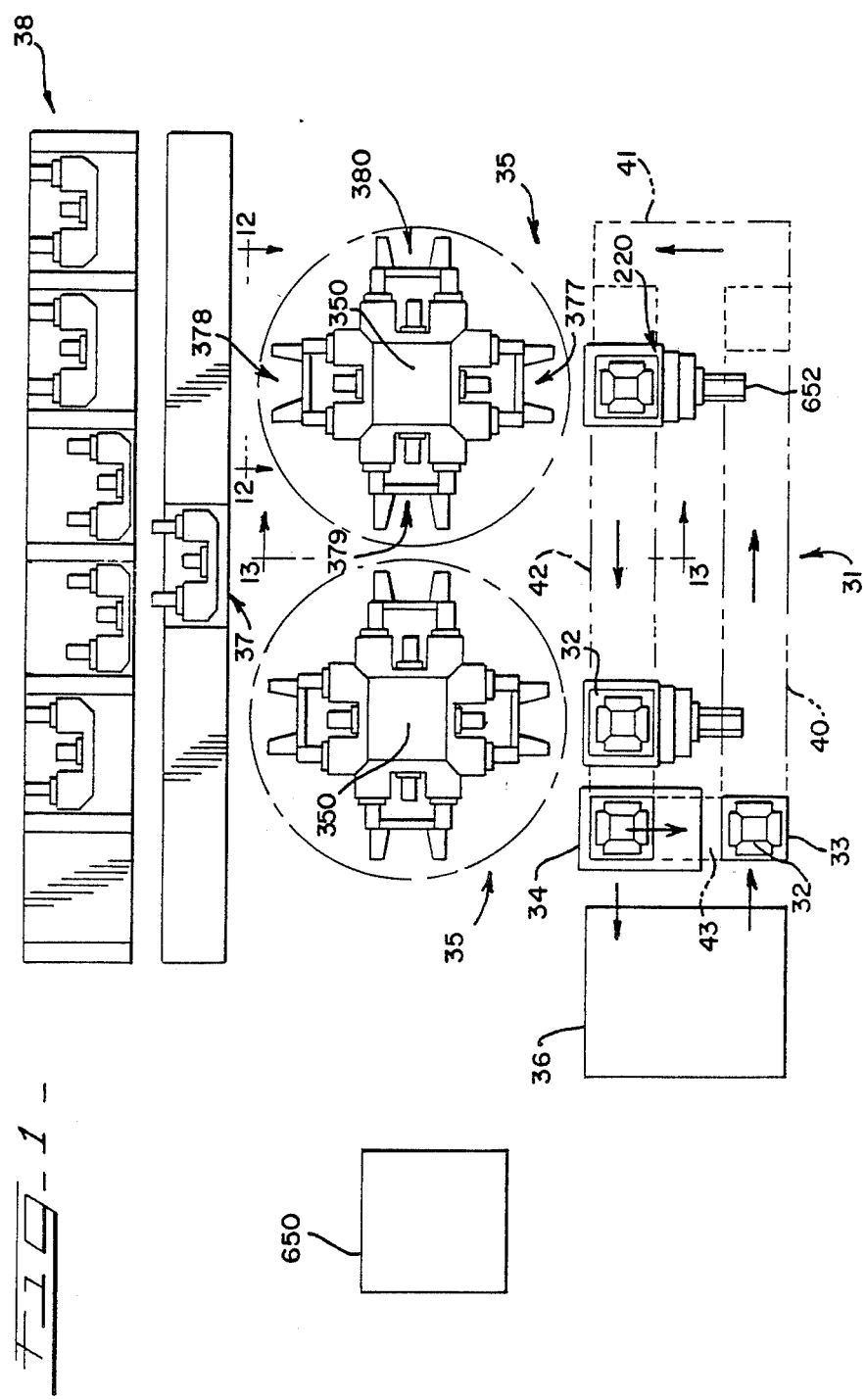

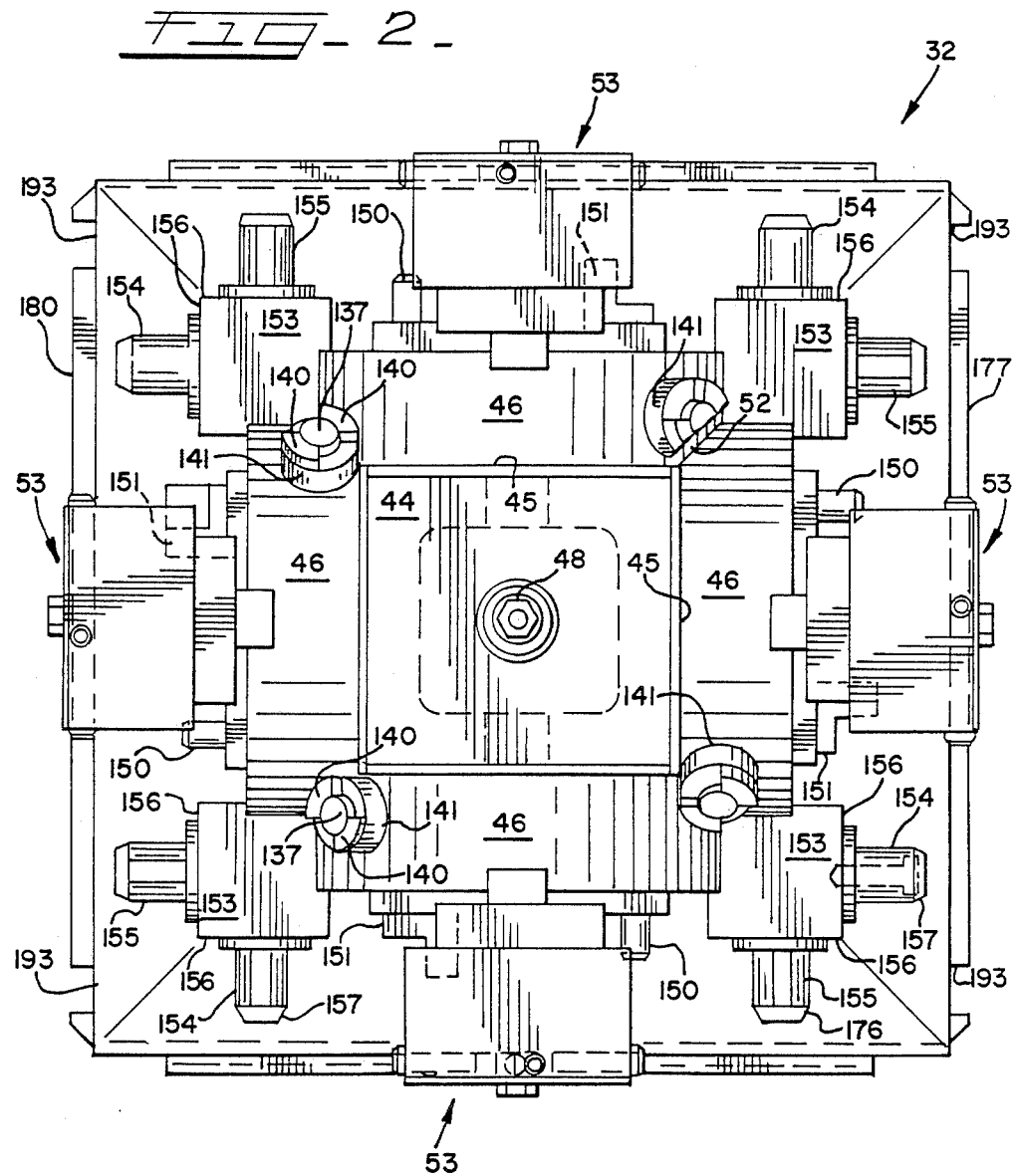

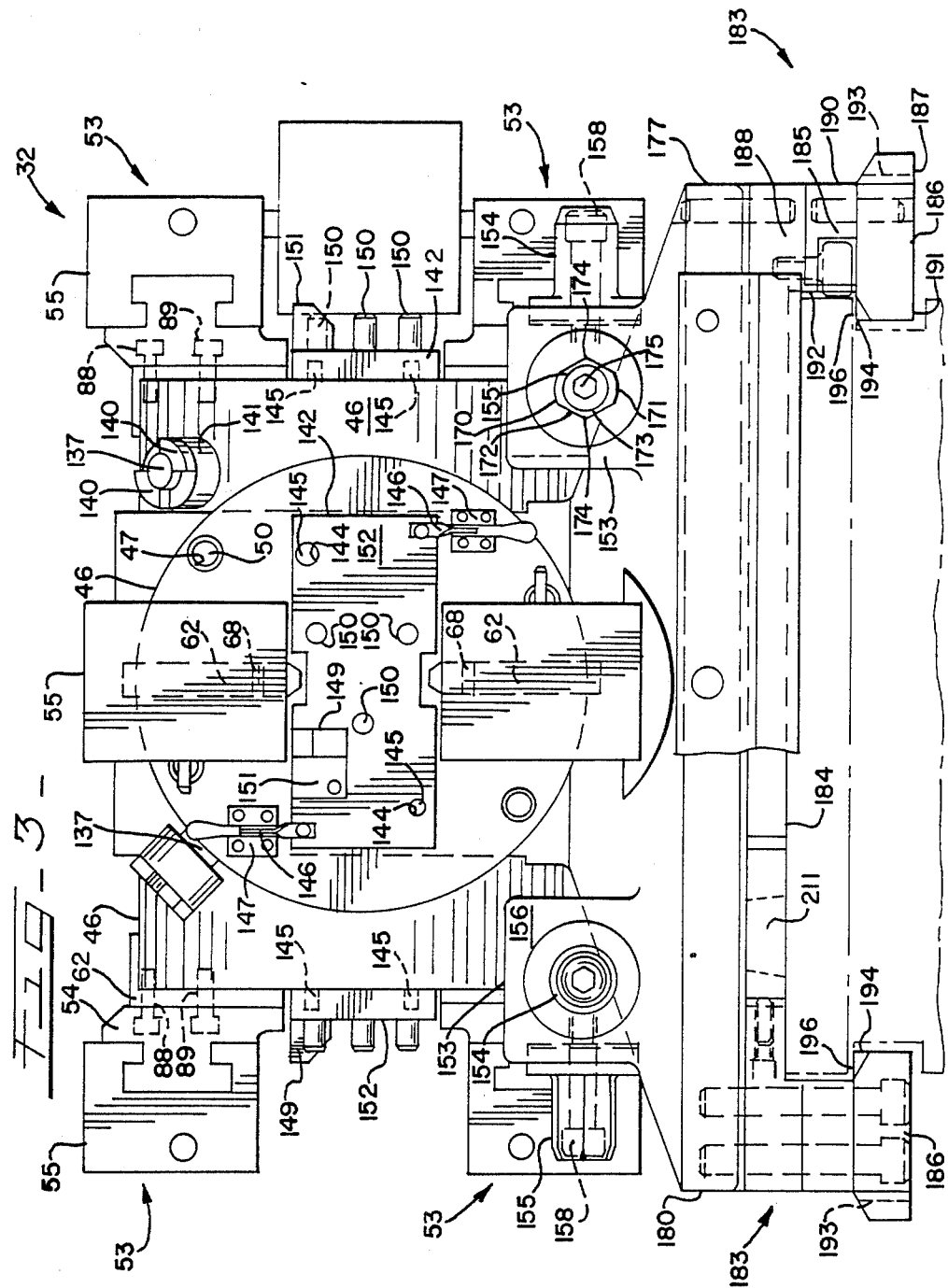

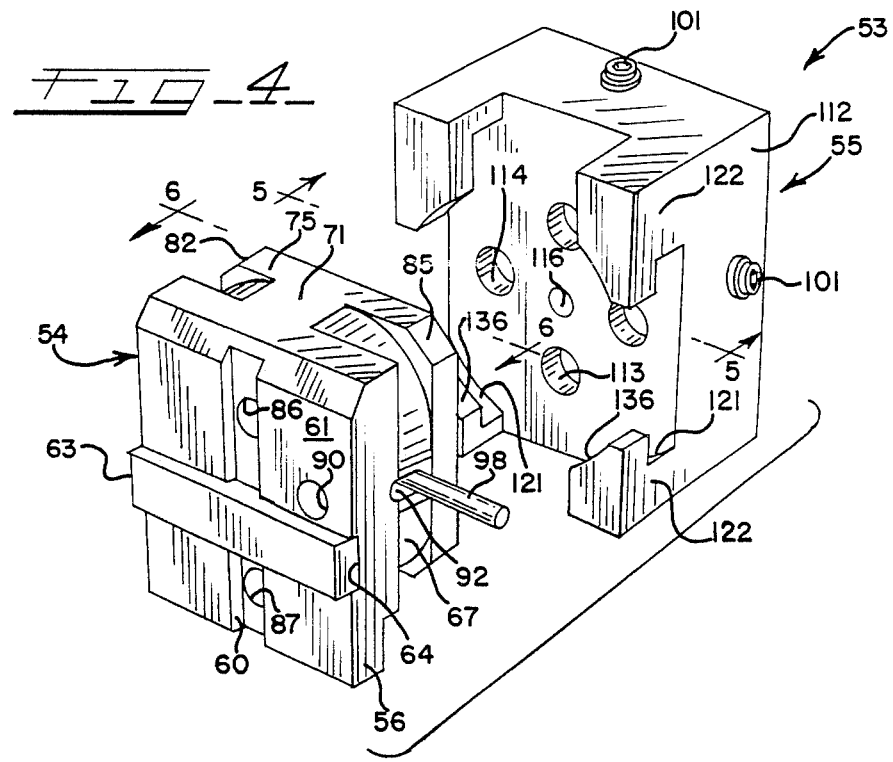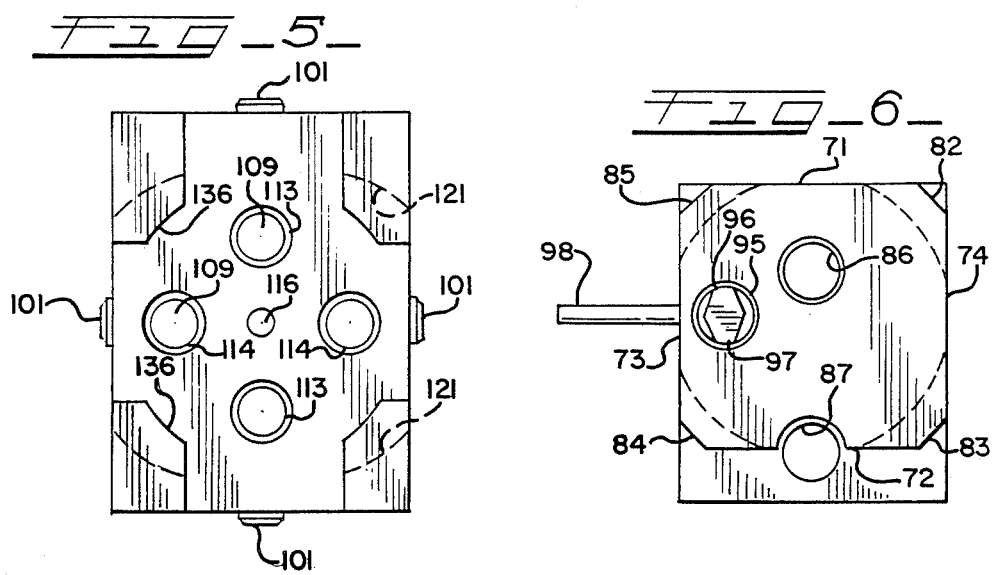

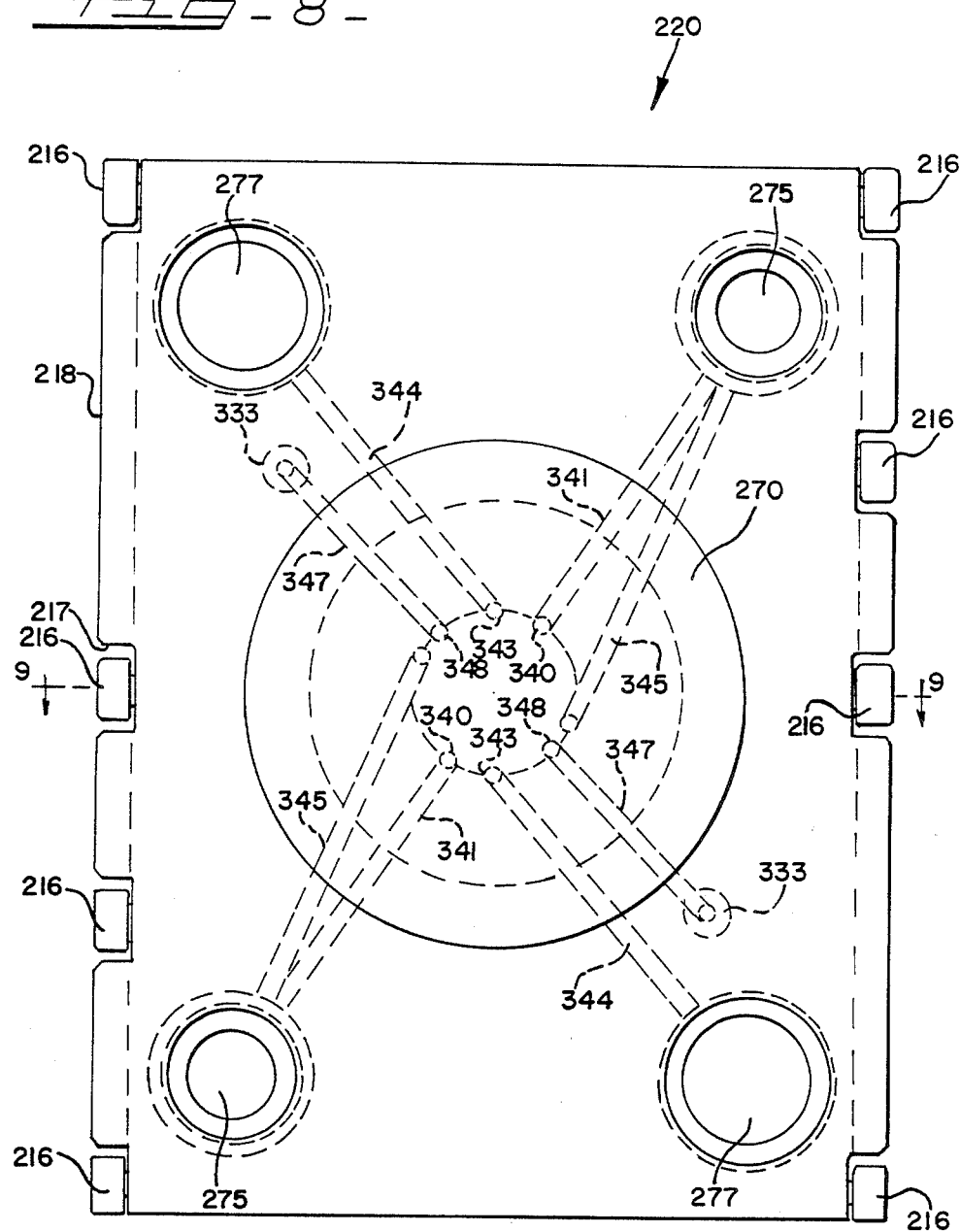

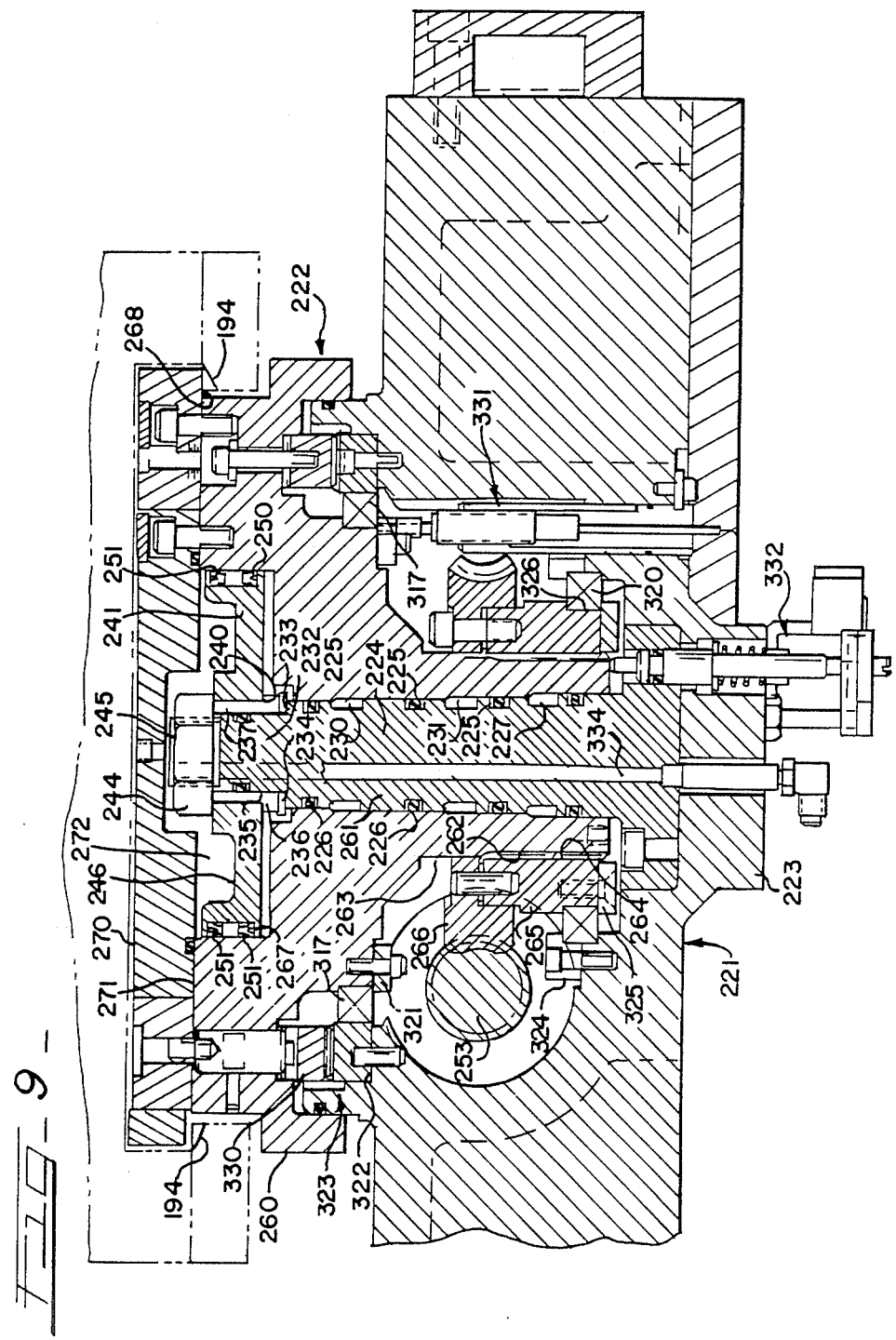

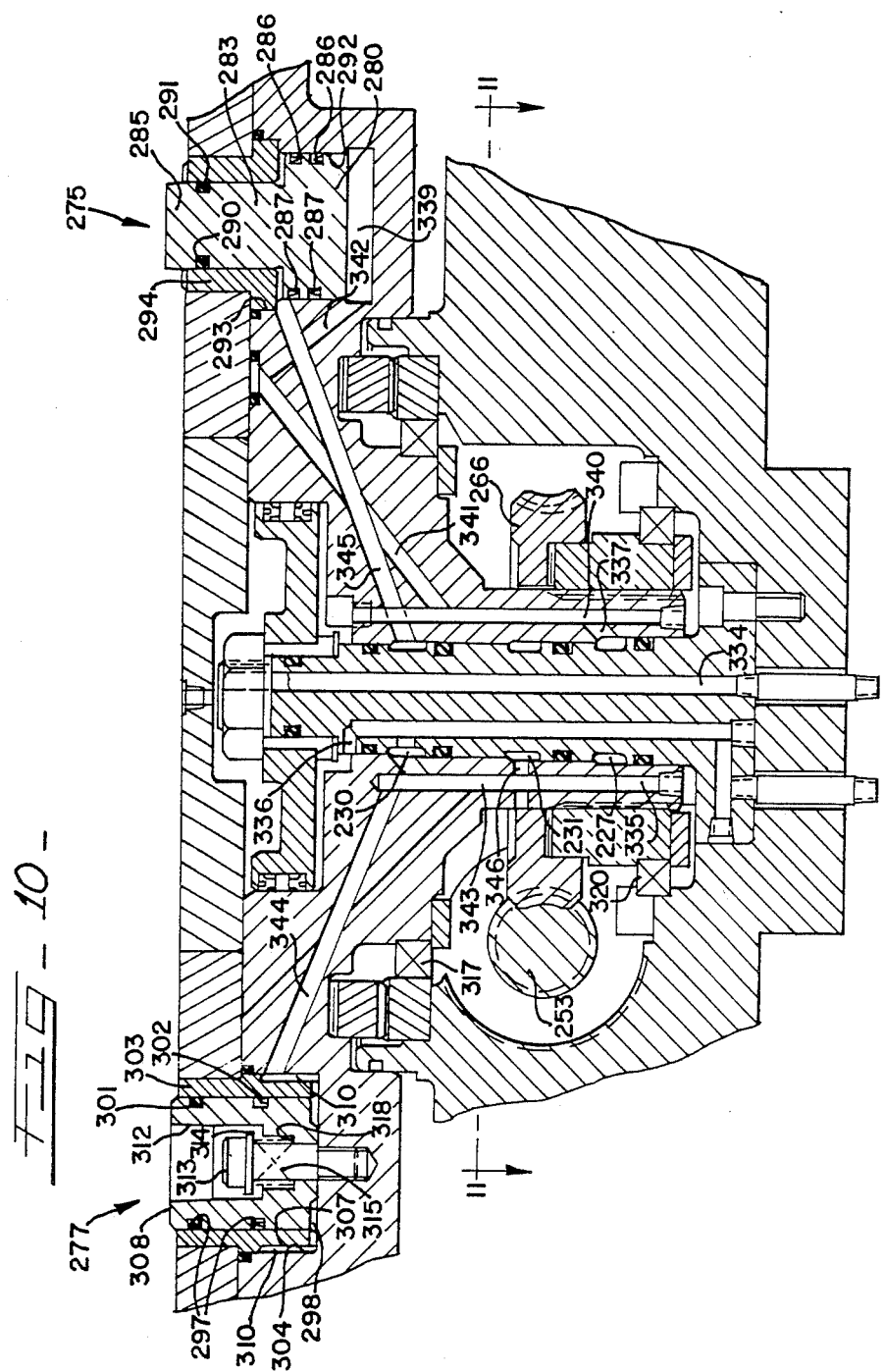
FIG-10-

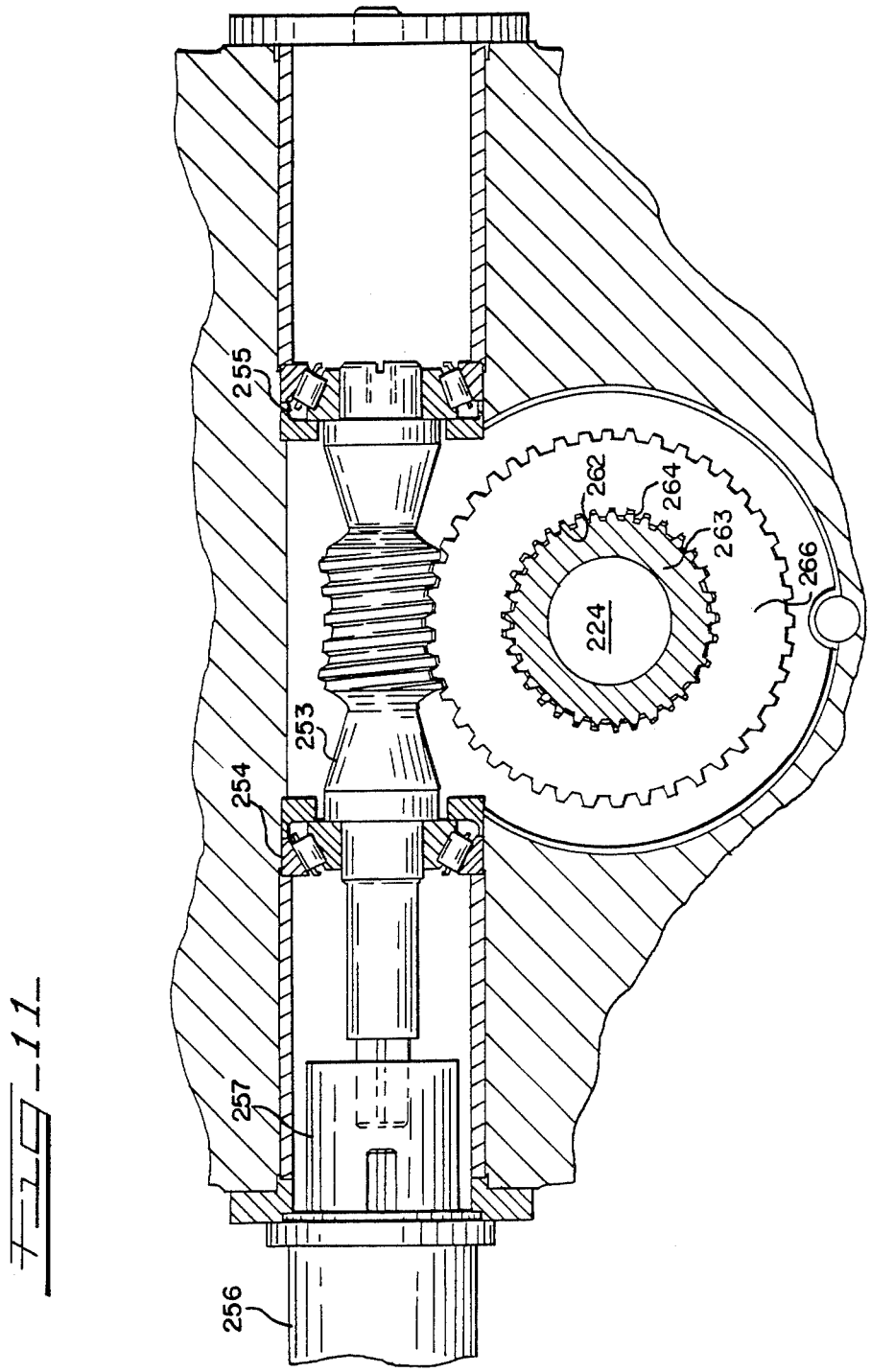

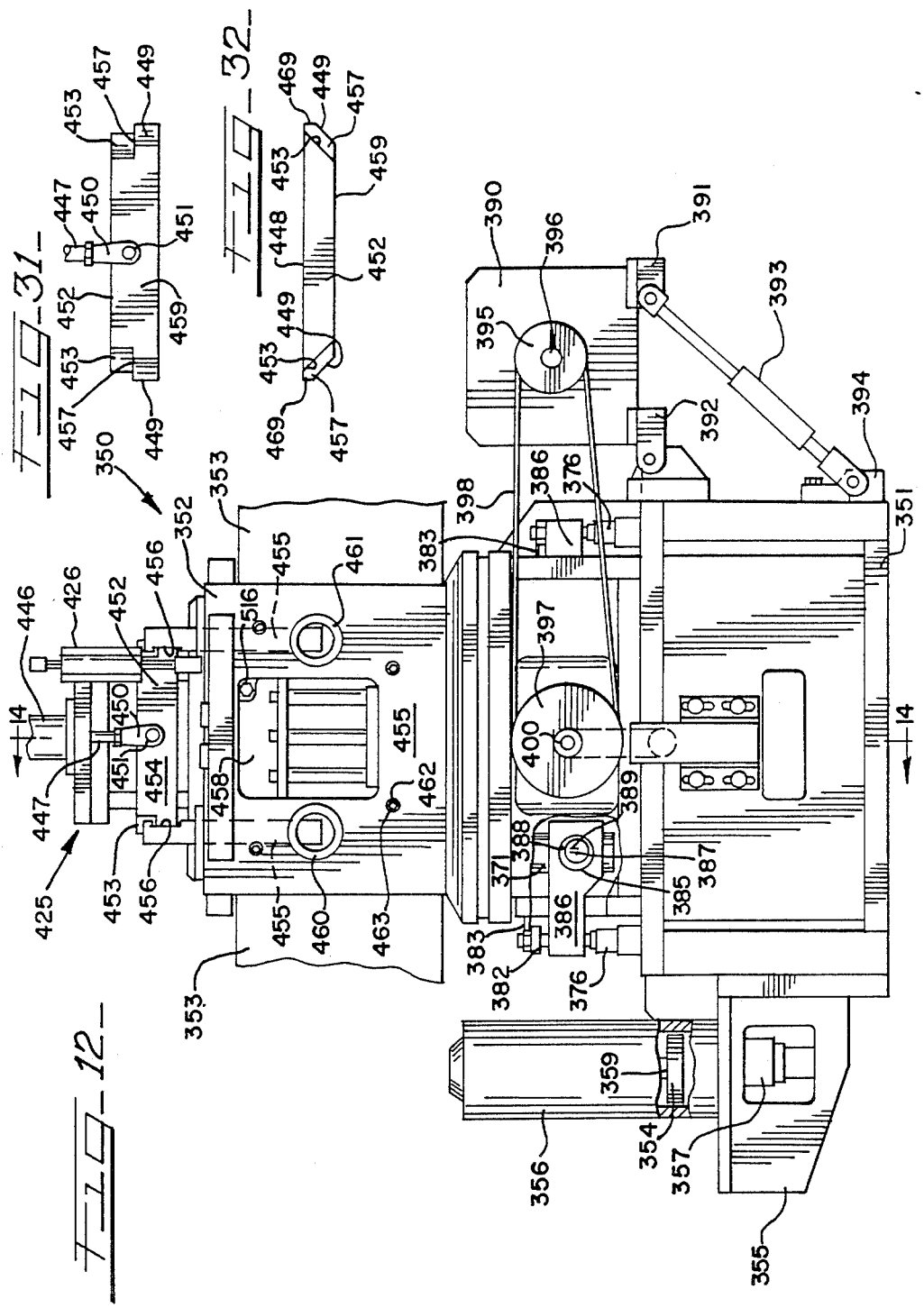

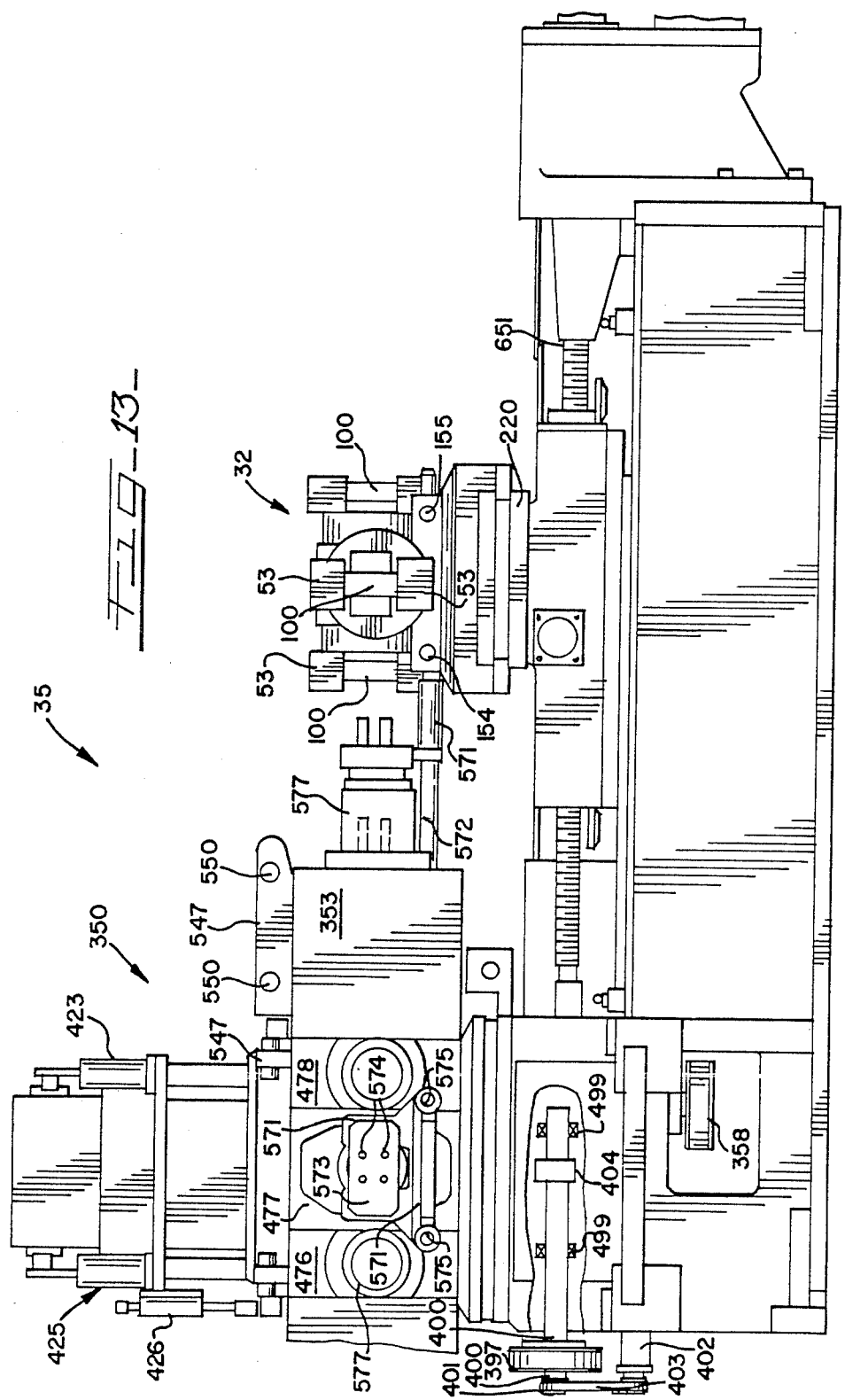

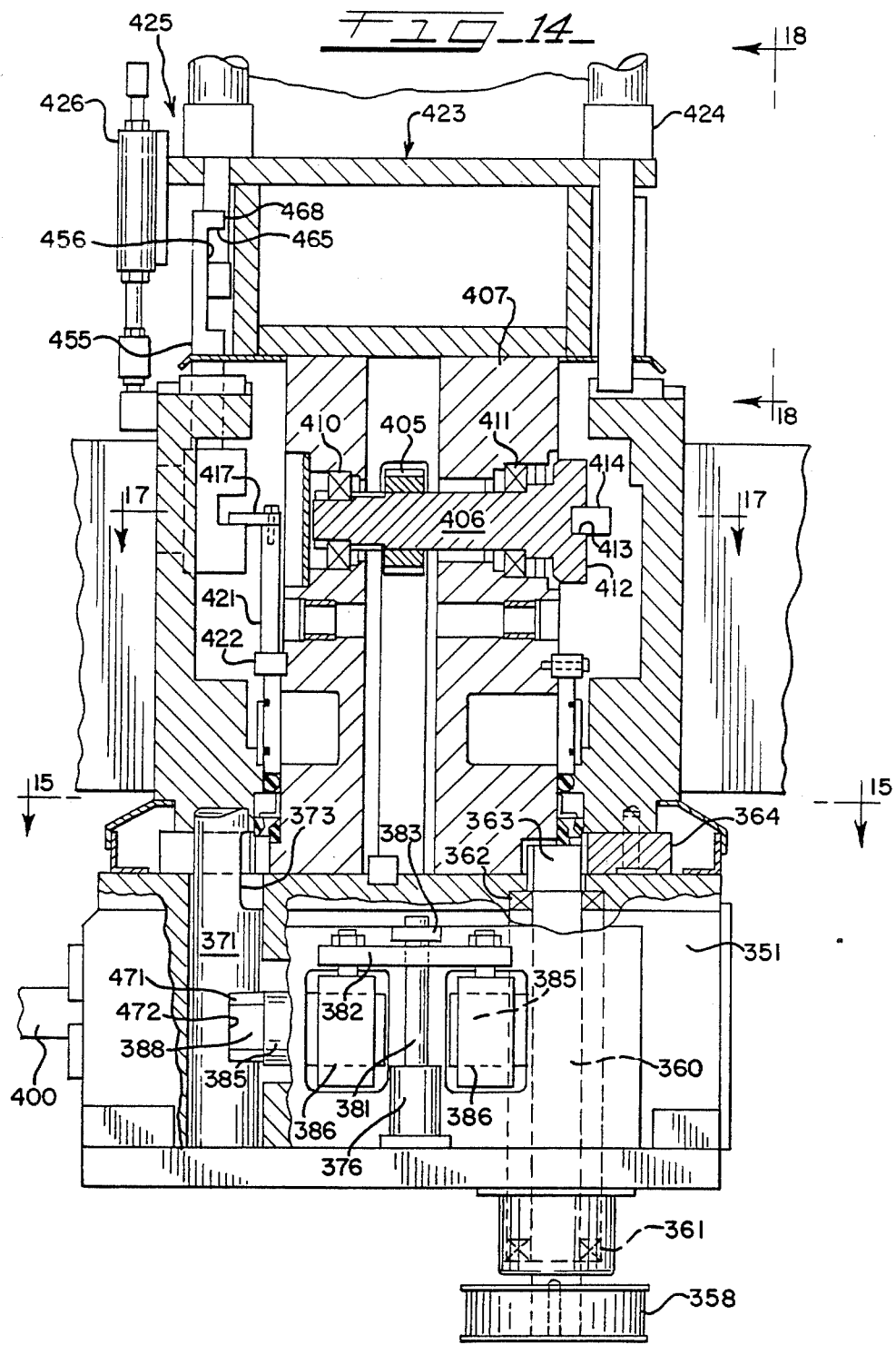

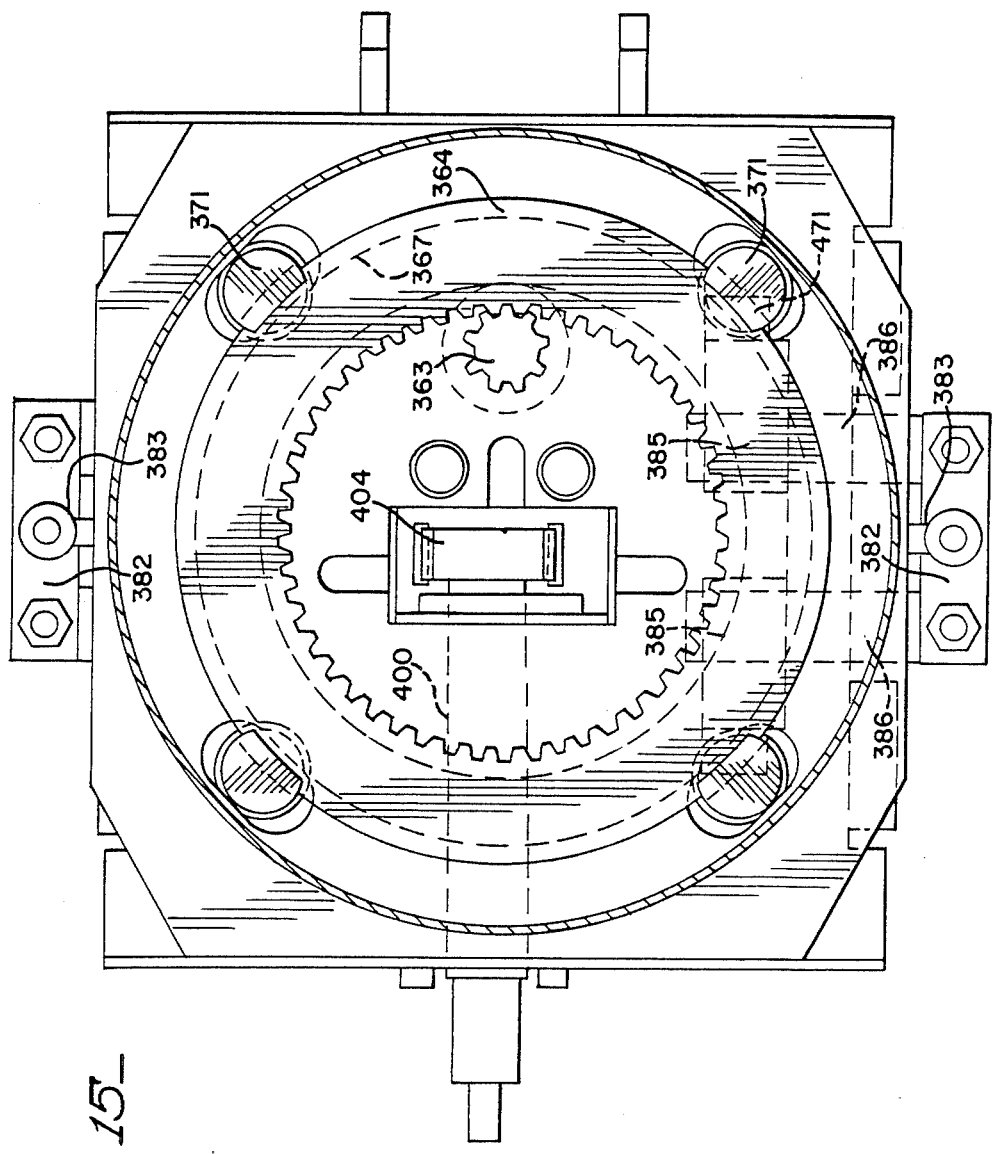

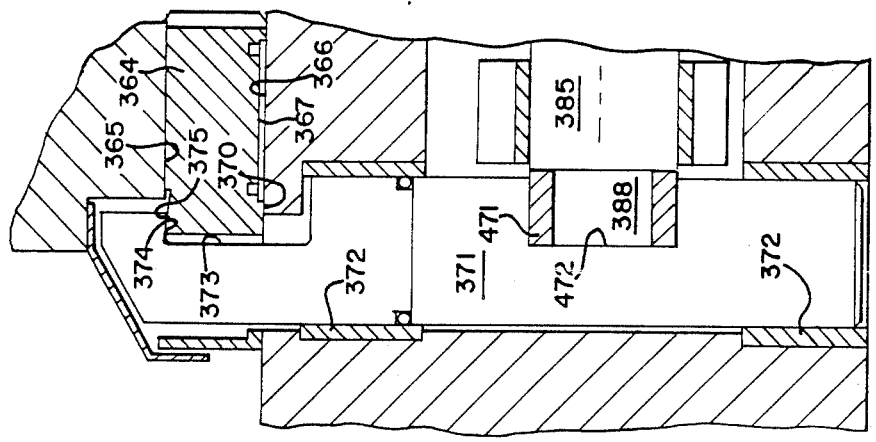
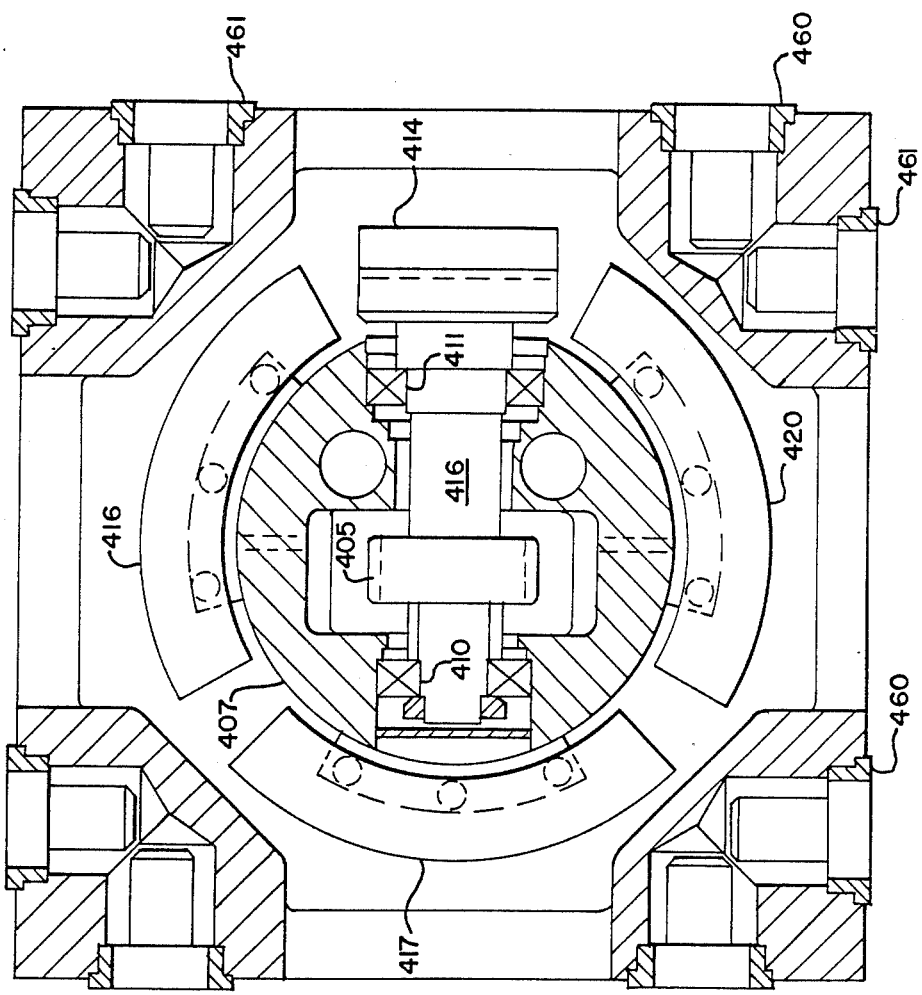

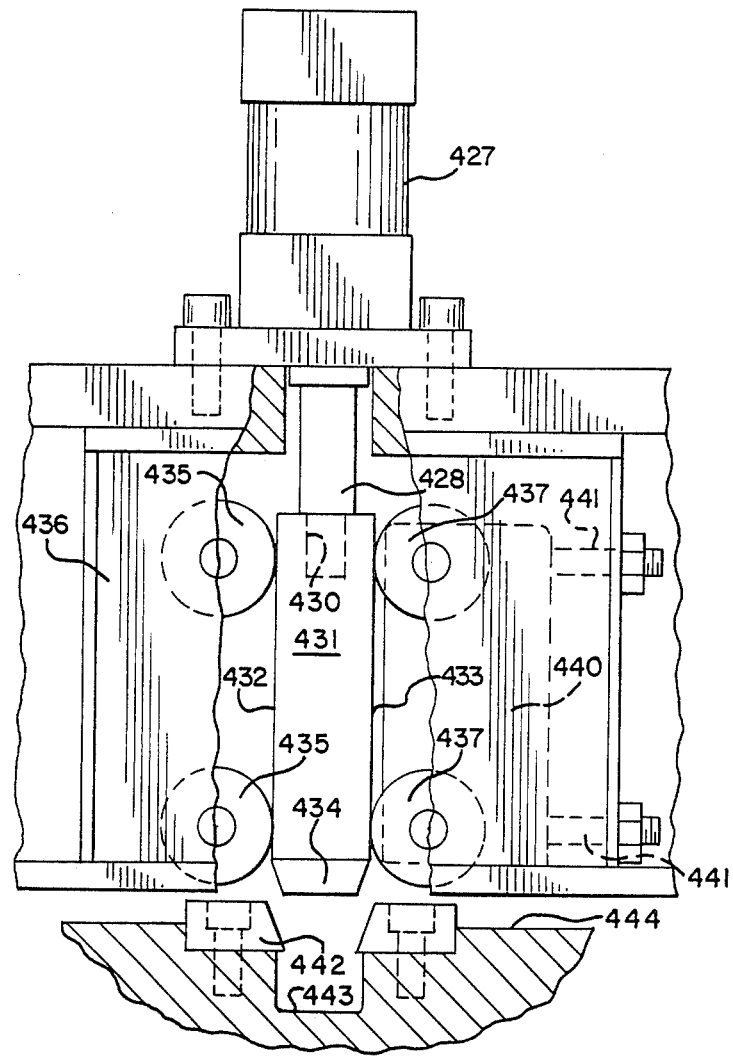
FIG_18_

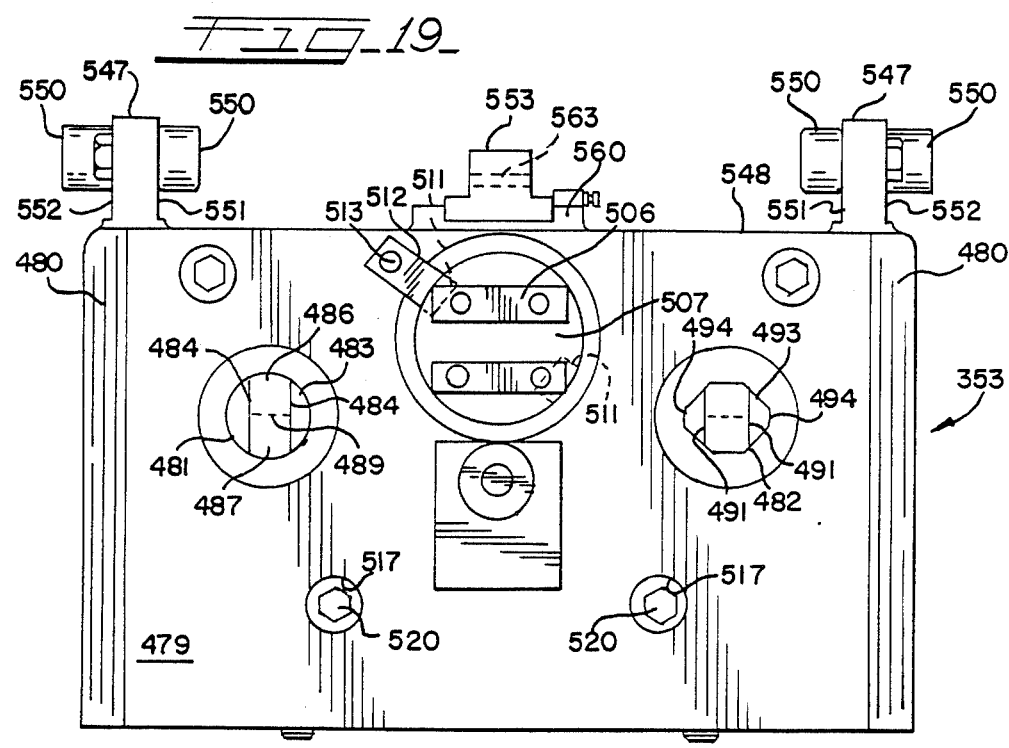
FIG_19_
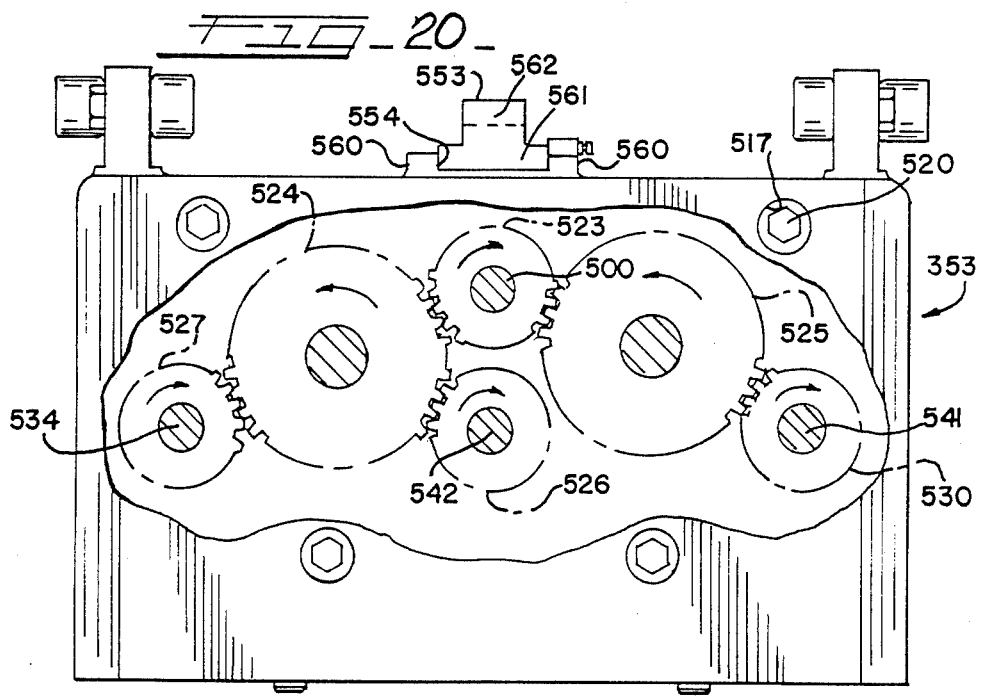
FIG_20_

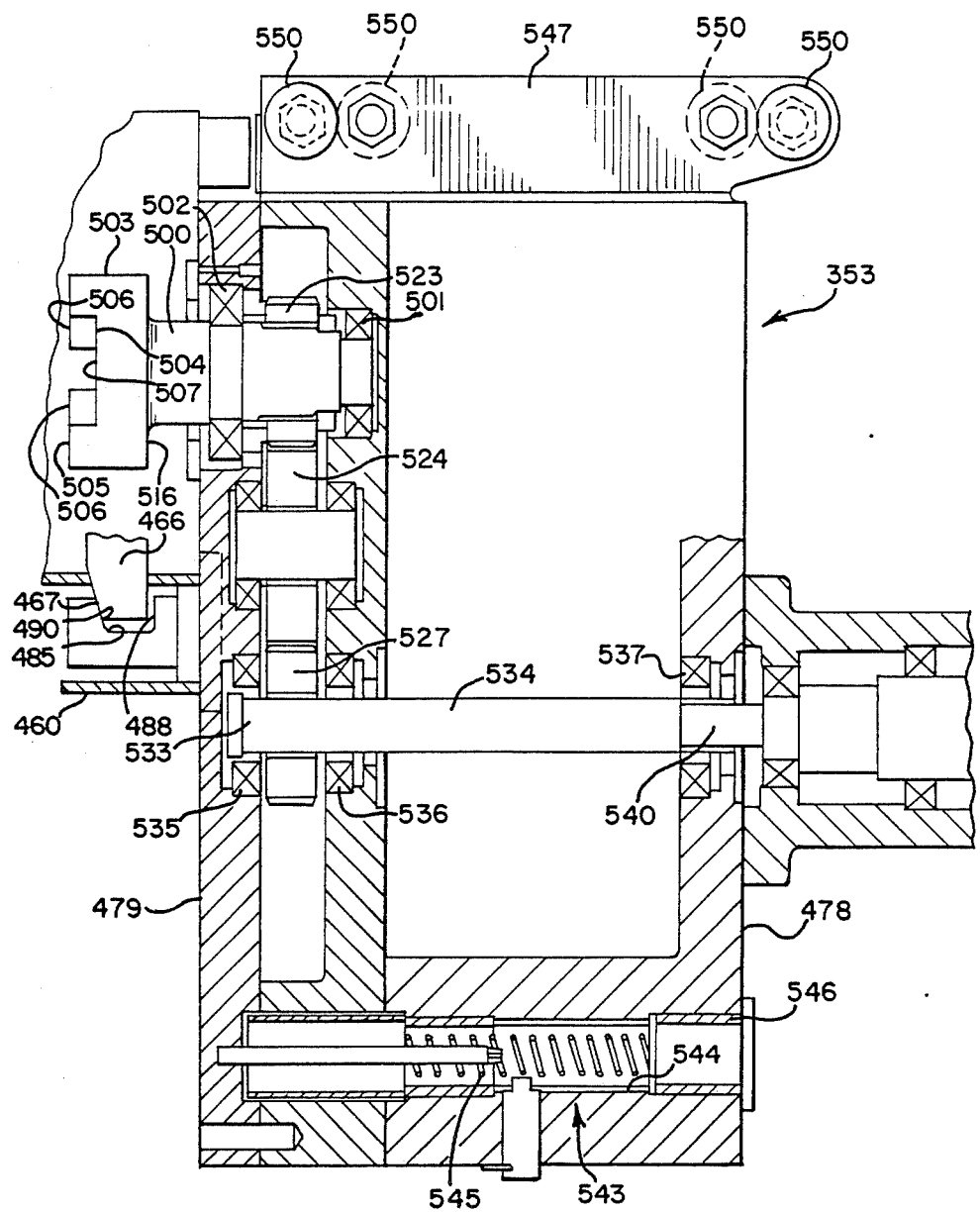

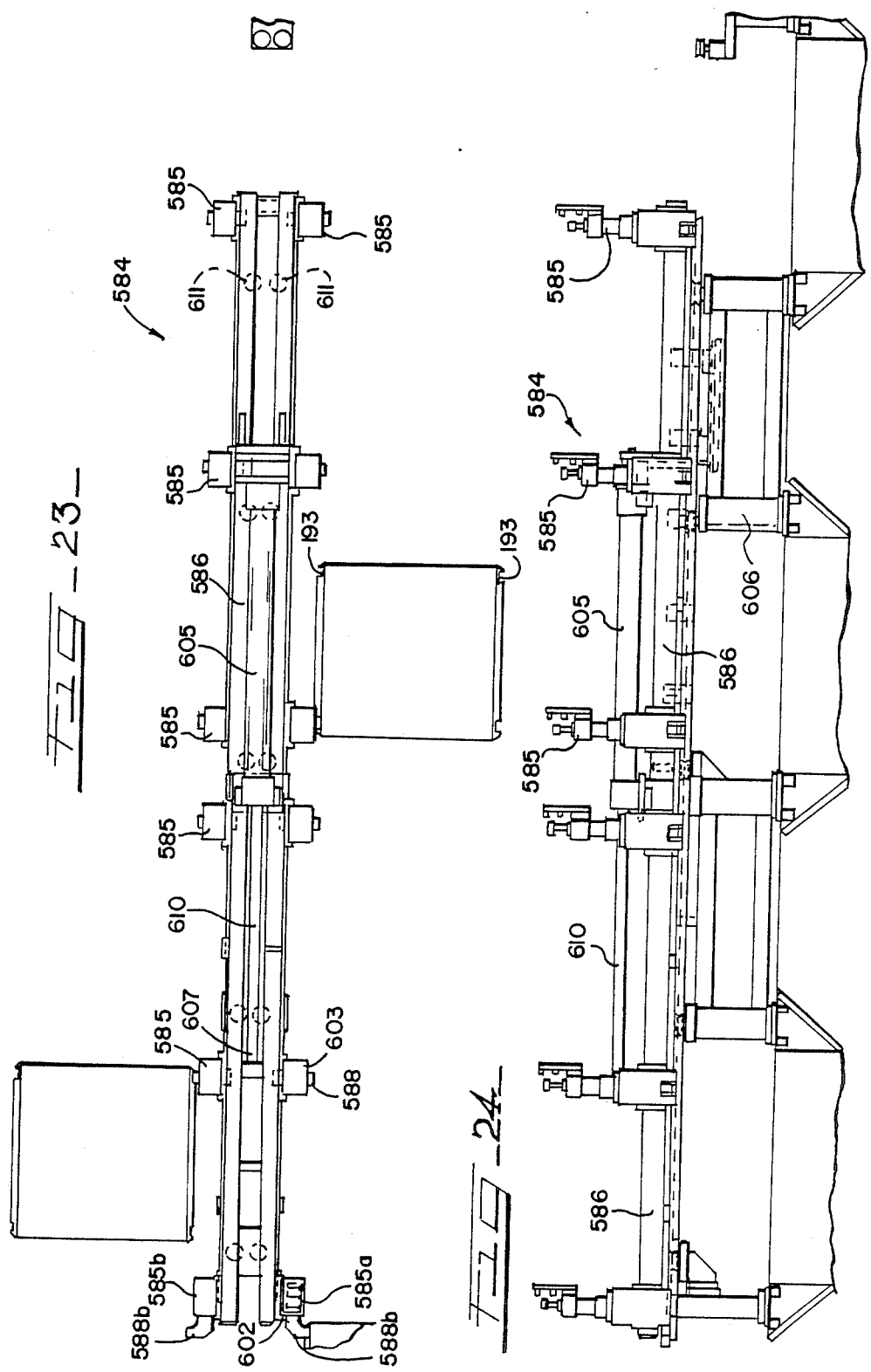

FIG. 27
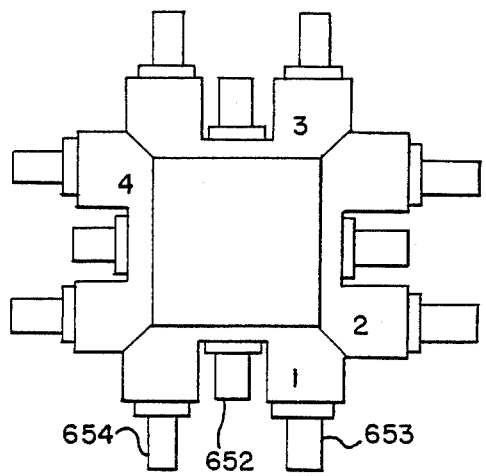
654  652  653
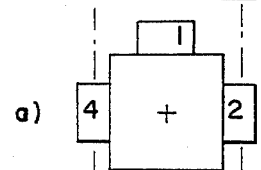
a)
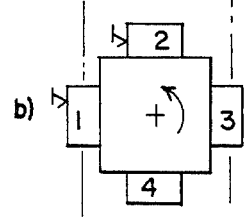
b)
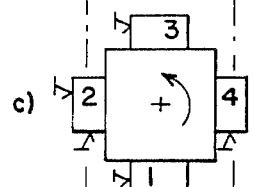
c)
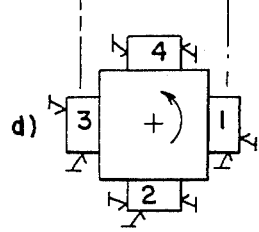
d)
FIG. 28
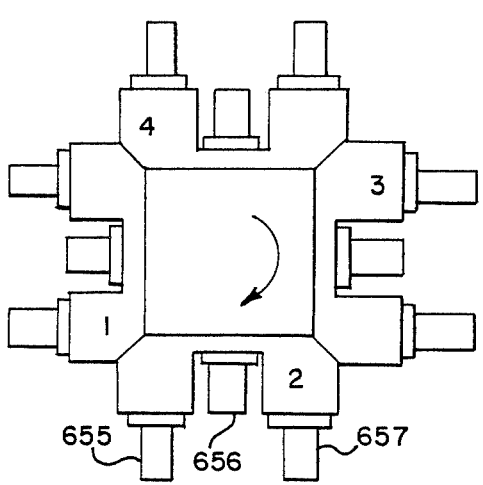
655  656  657
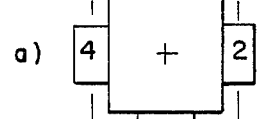
a)
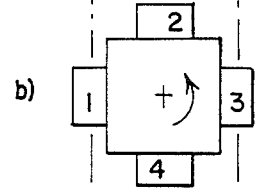
b)
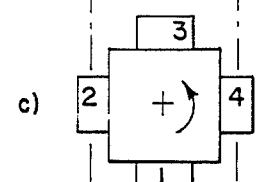
c)
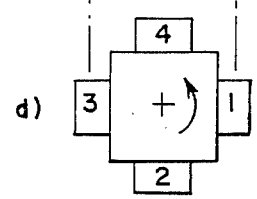
d)

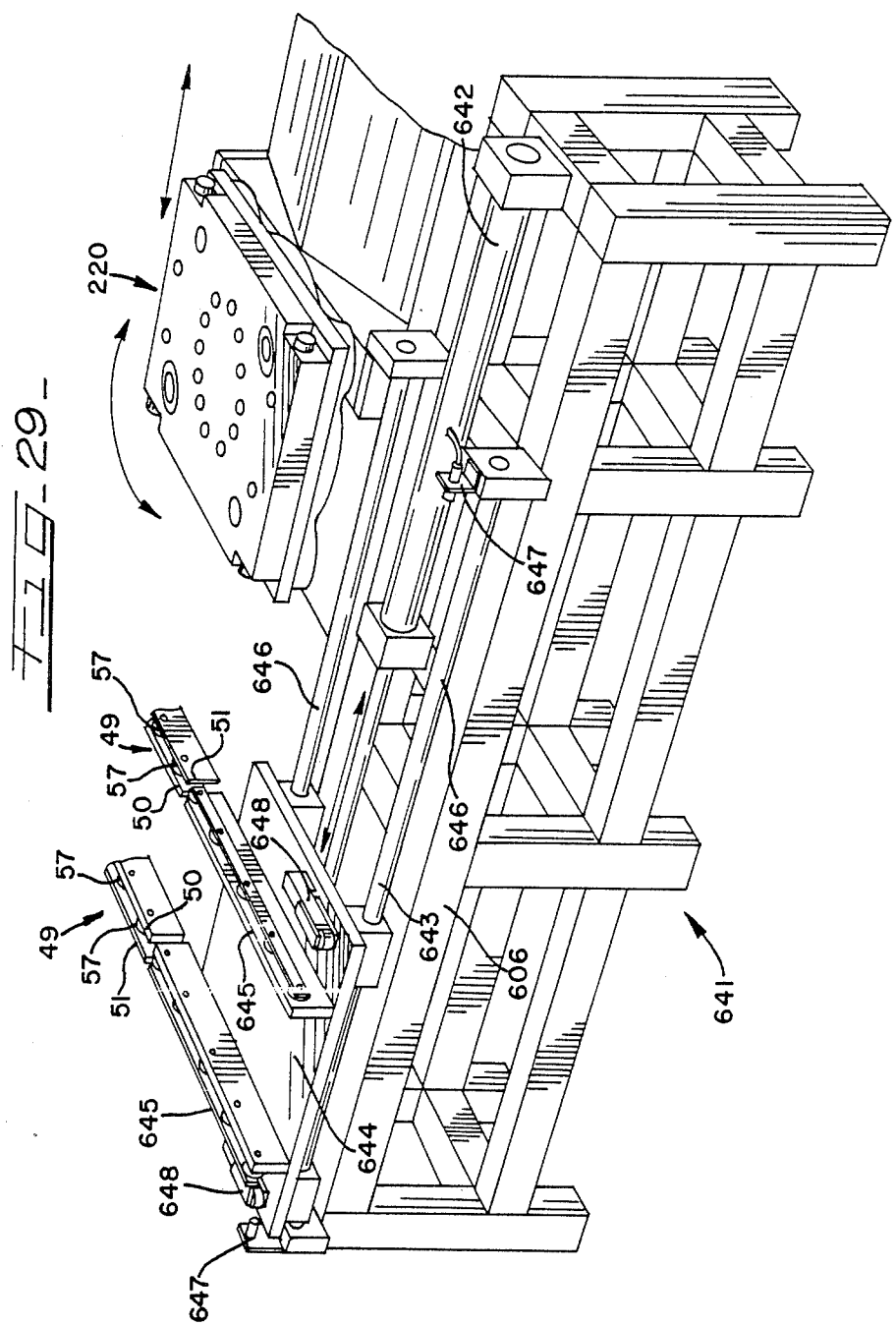

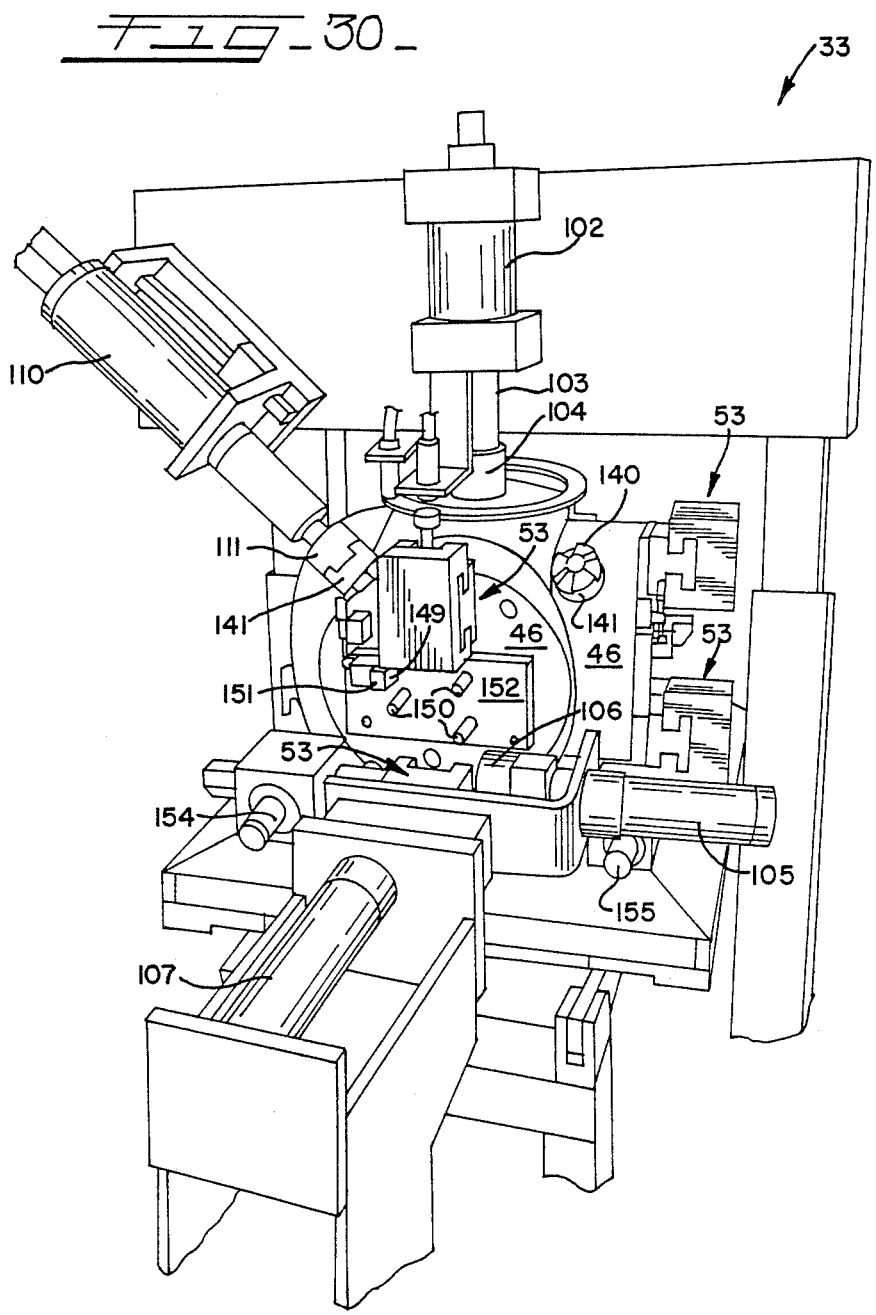

FLEXIBLE MACHINING SYSTEM

BACKGROUND AND SUMMARY OF THE INVENTION

The present invention relates generally to an automated machining system and more particularly, to an automated machining system in which various machining operations can be simultaneously performed on one face of a plurality of work pieces which are carried on a pallet.

Transfer machining systems are known which are more or less permanently set up to simultaneously perform a succession of multiple, high-speed machining operations on large quantities of work pieces which are synchronously conveyed from station to station throughout the system. Upon completion of the longest work cycle of the different machining stations, all of the work pieces are transferred simultaneously to the next machining station. Because the work pieces cannot be transferred until the machining operations at each station have been completed, the work pieces remain at each machining station for a length of time equal to the longest work cycle of any of the machining stations.

Since all of the work cycles at each machining station are usually not equal, time is wasted at the other machining stations while the entire system waits for the longest work cycle to be completed. Thus, the time required for a work piece to travel through the entire transfer system is substantially greater than the actual machining and transfer time. Additionally, if there is a failure to load a work piece into the transfer system between transfer cycles, a gap in the production line will exist which decreases productivity and causes needless wear on the transfer mechanisms.

As a result, there is a need for machining systems which are more flexible yet also capable of mass production on a somewhat smaller scale than permanently set up transfer machines. The term flexible machining system is used herein to designate an automated machining system which has a high degree of flexibility with respect to changing or performing various machining operations on a variety of work pieces.

In a machining system of the present invention, a high degree of flexibility is provided by having each machining cell of each machining station equipped with a drive turret on the sides of which a plurality of different machine heads can be attached and having the work piece supporting pallets likewise supported on turrets which allow different surfaces of the work pieces mounted thereon to be presented for machining to the different machine heads. The machining system of the present invention includes a track having a pallet loading station and a pallet unloading station juxtaposed to the track, and at least one machining station juxtaposed to the track at a location between the loading and unloading stations. A plurality of pallets are supported for movement along the track between the unloading and loading stations and past the machining station. Each pallet is set up for mounting at least one work piece in a predetermined position thereon. The system also includes a series of mechanisms for moving the pallets along the track, a mechanism for locating and securing each pallet in a predetermined location at the machining station. Additionally, the system has a mechanism for sequentially rotating each pallet through a plurality of positions once it is located and secured at each machining station whereby different surfaces of the work pieces mounted thereon are selectively presented to tools on the machining station (e.g. drills, taps, etc.) for machining thereof and a mechanism at each machining station for producing relative movement between the pallet and the work station.

In operation, each pallet is brought into position with respect to one or more machining cells which are suitably programmed and set up to simultaneously perform a series of machining operations on one face of a plurality of work pieces mounted on the pallet. Upon completion of the machining operations on those faces, the entire pallet is partially rotated, thus presenting different faces of the work pieces to the machining cell for machining thereof. This sequence of machining the work pieces and stepwise rotation of the pallet is repeated until the front and vertical side faces of each work piece have been machined. If desired, the drive turret of the machining cell can then be rotated, presenting a different set of tools for machining the work pieces. The sequence of machining the work pieces and rotating the pallet is then repeated until the front and vertical side faces of each work piece have been machined for a second time. This sequence of drive turret rotation, machining and pallet rotation can be repeated until the work pieces have been machined as desired.

The object of this invention, generally stated is the provision of a flexible machining system which is particularly useful for accurately and rapidly machining work pieces.

An important object of the invention is the provision of such a flexible machining system which utilizes a track upon which a plurality of pallet carrying work pieces are slid between a loading and an unloading station, with at least one machining station therebetween, the pallets and machining stations being designed so that one side of three work pieces can be machined simultaneously.

Certain other objects of the invention will be obvious and others will be apparent to those skilled in the art from the following detailed description of a presently preferred embodiment of the invention taken in connection with the accompanying drawings wherein:

BRIEF DESCRIPTION OF THE DRAWINGS

FIG. 1 is a partially diagrammatic top plan view of the flexible machining system showing the configuration of the track and the location of two machining stations and the machine head changing mechanism and storage area;

FIG. 2 is a top plan view of a work piece supporting pallet forming one element of the system of FIG. 1;

FIG. 3 is a side elevational view, partly broken away, of the pallet shown in FIG. 2;

FIG. 4 is an exploded perspective view of one of the clamping mechanisms which is mounted on the pallet shown in FIG. 3;

FIG. 5 is an elevational view on line 5—5 of FIG. 4 of the rotational member forming one component of the clamping mechanism;

FIG. 6 is an elevational view on line 6—6 of FIG. 4 of the fixed member forming another component of the clamping mechanism;

FIG. 8 is a top plan view of the pallet locating, securing and rotating mechanism operatively associated with the pallet of FIGS. 2 and 3;

FIG. 9 is a detail sectional view of the pallet clamping, locating and securing mechanism taken on line 9—9 of FIG. 8;

FIG. 10 is a detail sectional view of the pallet locating, securing and rotating mechanism taken on line 10—10 of FIG. 8;

FIG. 11 is a fragmentary horizontal sectional view taken on line 11—11 of FIG. 10;

FIG. 12 is a rear elevational view on line 12—12 of FIG. 1 of the machine head replacement side of the drive turret of a machining cell with the rear machine head removed;

FIG. 13 is a side elevational view on line 13—13 of FIG. 1 of a machining station with the spindle drive motor of the machining cell removed and showing a pallet on the pallet locating, securing and rotating mechanism in one interacting position with respect to the machine head located on the spindle drive side of the drive turret, prior to machining of the work pieces;

FIG. 14 is a detail sectional view of a machining cell, on an enlarged scale, taken substantially on line 14—14 of FIG. 12;

FIG. 15 is a horizontal sectional view, on an enlarged scale, taken substantially on line 15—15 of FIG. 14;

FIG. 16 is a fragmentary enlarged sectional view of the interaction between a clamping post and the ring gear;

FIG. 17 is a horizontal sectional view, on an enlarged scale, taken substantially on line 17—17 of FIG. 14;

FIG. 18 is a fragmentary front view, partly in section, taken on line 18—18 of FIG. 14 of the turret alignment assembly of the machining cell;

FIG. 19 is a rear elevational view of a machine head which is mounted on the drive turret shown in FIG. 12;

FIG. 20 is a rear elevational view, partly broken away, of the machine head of FIG. 19;

FIG. 22 is a detail sectional view, with the gears not to scale, of the machine head shown in FIG. 19 and showing the interaction between the gears;

FIG. 23 is a top plan view of the pallet shuttle mechanism located between the sections of track shown in FIG. 1;

FIG. 24 is a side elevational view of the pallet shuttle mechanism shown in FIG. 23;

FIG. 27 is a diagrammatic view illustrating the machining sequence illustrating the machining sequence of the system shown in FIG. 1;

FIG. 28 is a diagrammatic view corresponding to FIG. 27 but with the drive turret rotated 90°;

FIG. 29 is a perspective view of one of the transfer mechanisms for transferring pallets between adjacent ends of the long sections of track;

FIG. 30 is a perspective view of the load/unload station operatively associated with a pallet;

FIG. 31 is an elevational view of the cross-head of the machine head release assembly shown in FIG. 12;

FIG. 32 is a top plan view of the cross-head shown in FIG. 31.

DESCRIPTION OF THE PREFERRED EMBODIMENT

Figure 7:
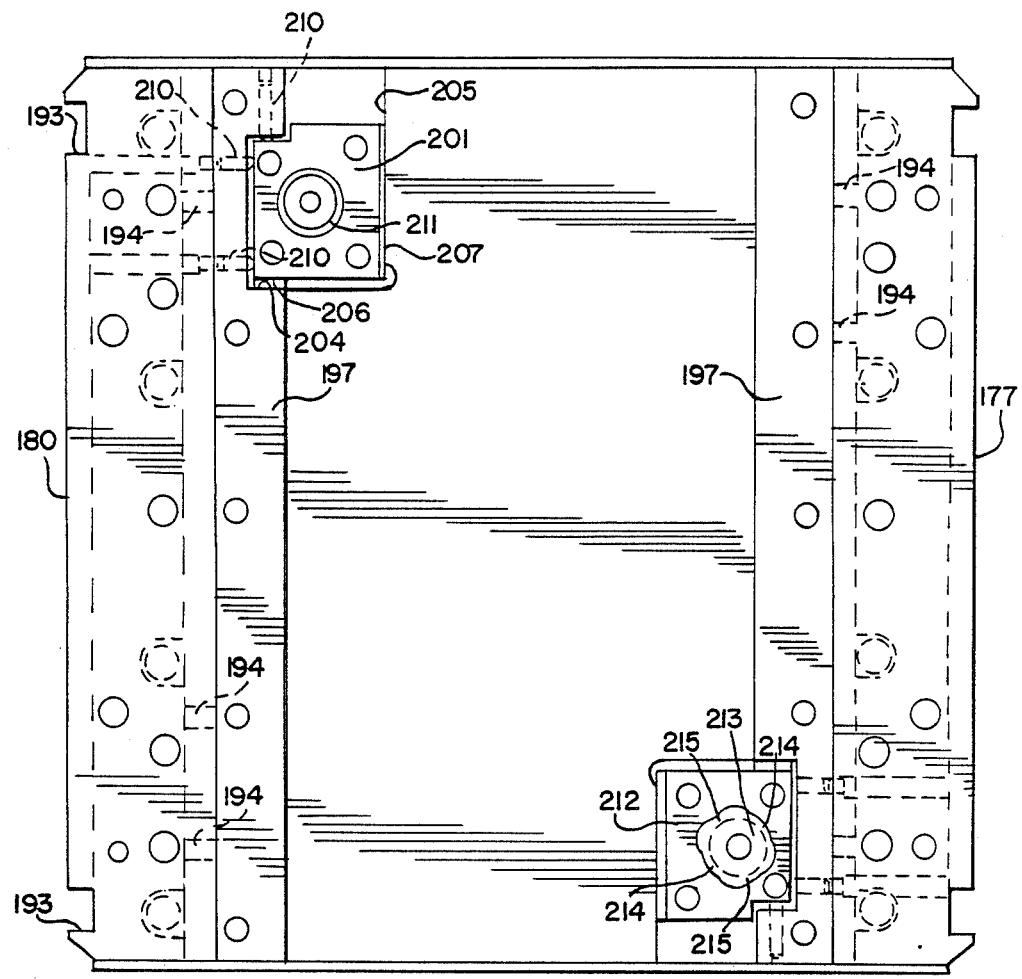
FIG. 7 is a bottom view of the pallet shown in FIGS. 2 and 3.

Referring to FIG. 1, a flexible machining system forming a representative embodiment of the invention is indicated generally at 30. The machining system 30 includes a closed circuit track indicated generally at 31 with a plurality of work piece carrying pallets 32—32 slidably supported for non-synchronous movement thereon. Track 31 has a loading/unloading station 33, wash station 34 and two machining stations indicated generally at 35—35 juxtaposed to track 31 between loading/unloading station 33 and wash station 34. It should be understood that, if desired, the loading/unloading station 33 could be divided into two separate stations. A change-over area 36 is in sliding relationship with track 31 adjacent the stations 33 and 34 so that various maintenance or change-over operations can be performed on certain pallets 32 without interrupting the flow of other pallets around track 31. A machine head replacement mechanism indicated generally at 37 and a machine head storage rack indicated generally at 38 are located to the side of machining stations 35 which is opposite track 31.

Track

Track 31 includes a series of longer straight sections 40 and 42 and shorter sections 41 and 43 connected together in known manner so as to form an endless track. Sections 40 and 42 are comprised of a pair of spaced parallel rails (FIG. 29) which in turn are comprised of a pair of parallel members 50 and 51 having a plurality of rollers 57 mounted therebetween. Each roller 57 is mounted so that its axis of rotation is horizontal and perpendicular to the parallel members. The top edge of each roller 57 is slightly higher than the parallel members 50 and 51. Sections 41 and 43 as hereinafter described are actually transfer mechanisms for transferring pallets 32 between adjacent ends of track sections 40 and 42.

Pallet Assembly

Each pallet 32 (FIGS. 2 and 3) has a centrally located column 44 with four vertical faces 45—45 and a frusto-conically shaped centering post 48 centrally mounted on top of column 44. The centering post 48 is relied upon to center the pallet 32 during the loading operation as hereinafter described. As shown in FIGS. 2 and 3, a two-jaw chuck 46 is fixedly mounted to each face 45 of center column 44. These two-jaw chucks 46 are of conventional type such as hose used on conventional lathes but are modified to permit fixed mounting thereof. First, chucks 46 have counterbored holes 47 therein through which bolts 50 extend to secure each chuck 46 to a face 45 of center column 44. Additionally, because the diameter of each chuck 46 is greater than the width of the vertical faces 45, without modification there would be interference between the outer horizontal edges of the chucks and thus the rear faces 51 of the chucks 46 could not simultaneously abut the vertical faces 45 of center column 44. Accordingly, the rear corners of the chucks 46 are mitered at 45° as indicated at 52—52.

Each chuck 46, as with other conventional chucks, has an internal mechanism (not shown) of known type for opening and closing the jaws of the chuck. The internal mechanism drives identical upper and lower so-called "top-jaw" mounting members 62—62. In the present invention, both conventional upper and lower top-jaws have been replaced by the clamping mechanisms 53—53 shown in detail in FIGS. 4-6. Both upper and lower clamping mechanisms 53 are substantially identical. Each clamping mechanism 53 has a fixed member indicated generally at 54 which is mounted to one of the conventional top-jaw mounting members 62. A releasably mounted rotational member indicated generally at 55 is rotatably mounted on each fixed member 54.

Each of the members 54 and 55 may be formed or machined from a single piece of material, preferably steel or other suitable metal. The fixed member 54 comprises three integral sections, a rear or outer generally rectangular section 56, an intermediate generally cylindrical section 67 and an inner or front generally rectangular section 75. The cylindrical surface of section 67 is interrupted with flat or straight portions at the top and bottom and at opposite sides as indicated at 71, 72, 73 and 74. The corners 85 of the front inner section 75 are removed for rotational purposes which will be further described below.

The outer face 61 of the rectangular section 56 is provided with a vertical slot 60 and with a transverse or horizontal slot 64. The vertical slot 60 receives a top-jaw mounting member 62 on the chuck 46. The horizontal slot 64 accommodates or receives a portion of a supporting key or member 63 which projects into a horizontal slot 68 (FIG. 3) in the top-jaw mounting member 62. By this arrangement the weight of the clamping mechanism 53 comprising the members 54 and 55 is carried by the top-jaw mounting member 62.

A pair of vertically aligned counterbored holes 86 and 87 are provided in the vertical slot 60 of fixed member 54 so as to accommodate bolts 88 and 89 (FIG. 3). These bolts serve to attach the fixed member 54 to the respective top-jaw mounting member 62.

The fixed member 54 is provided with a third counterbored hole 90 which receives a reciprocating plunger 94 which has a normally protruding or projecting hexagonally shaped latch portion. This latch portion has arcuate top and bottom surfaces 96 and 97. The portion is retractable within the hole 90 against the force of a compression spring which is trapped between the end of the hole 90 and the inner end of the plunger.

A slot 92 is formed inwardly from one side 73 of the fixed member 54 so as to intersect the hole 90. This slot 92 accomodates a handle or lever 98, the inner end of which is anchored in the side of the plunger 94. It will be appreciated that handle 98 can be used to retract the plunger inwardly against he force of the spring so that the protruding latch section is completely withdrawn within the face of the fixed member 4. The counterbored hole 90 is provided with a bushing 5 in which plunger 94 smoothly reciprocates.

The rotational member 55 comprises a rectangular body portion 112, the inner side 115 of which has four projecting legs 122—122. Each of the legs 122 is provided with an inner arcuate surface 121—121 each of which has a center of curvature at 116. Each leg 122 also has an outer arcuate surface 136—136, which also has 116 as the center of curvature.

The inner face 115 of the member 55 is provided with four sockets 109—109 which are concentrically arranged with respect to the center 116. The two vertically aligned sockets 109, as shown in FIGS. 4 and 5, are provided with bushings 113—113 while the two horizontally aligned sockets 109 are provided with bushings 114—114.

Each of the four sides of the member 55 is provided with a work piece gripper 101 of known type having a mutilated gripping surface.

As shown in FIGS. 2 and 3 each rotational member 55 is mounted on its corresponding fixed member 54 and is rotational thereabout on the horizontal axis extending through the center point 116. Each of the rotational members 55 is placed on its respective fixed member 54 by rotating the member 55 so that the corners of the section 75 of fixed member 54 enter between the legs 122—122 of member 55. When a rotation member 55 is positioned in place on its fixed member 54 and rotated, the corners 82-85 on section 75 rotate within the inner arcuate surfaces 121—121. The outer arcuate surfaces 136—136 in turn rotate on the cylindrical surface of the cylindrical section 67. Since each of the sockets 109 are on the same circumference as the hole 90 and the hexagonal latch portion of plunger 94 which mates with the hole, the rotational member 55 is indexable in four different positions 90° apart with respect to the fixed member 54. Because a gripper 101 is located on all four sides of member 55, the clamping mechanism 53 can be rapidly changed over to clamp differently shaped work pieces by rotating members 55.

Since the latch portion of the plunger 94 is hexagonal with the top and bottom sides arcuate 96 and 97, a better fit with less wear is obtained as the latch repetively enters and is removed from the bushings 113 and 114.

Upper and lower clamping mechanisms 53 are mounted on the top-jaw mounting members 62 which are simultaneously driven in known manner upward or downward by the rotation of jaw drive shaft 137 (FIGS. 2 and 3). Jaw drive hub 140 is generally cylindrical in shape with a center bore dimensioned so as to receive drive shaft 137 which is fixed therein. Two annularly shaped drive tabs 140 extend upward from the top of drive hub 141.

Referring to FIG. 3, an alignment plate 142 is removably mounted on the front or outer face 143 of each chuck 46 between each pair of top-jaw mounting members 62. Each plate 142 is constructed and mounted so as to allow rapid substitution of differently configured alignment plates in order to rapidly change over the pallet 32 to machine differently shaped work pieces.

Two bores 144—144 in plate 142 mate with alignment pins 145—145 located on front face 143 of chuck 46 in order to align plate 142. Plate 142 is secured on pins 145 and against front face 143 of chuck 46 by two quick-release clamps 146—146 of known type. Clamps 146 are mounted on blocks 147—147 which in turn are mounted to the face 143 of chuck 46. In the embodiment shown, three cylindrical alignment posts 150—150 and a stop 151 are mounted to the front face 152 of each alignment plate 142. Alignment posts 150 are parallel and have equal length so that their outer ends lie in a common plane. Stop 151 is mounted near the top left corner of alignment plate 142, but leaving enough room for clamp 146. It will be seen that the position of each work piece is accurately obtained with respect to the x, y and z axes. The contact surface 149 of the stop 151 fixes the position on the x axis, the outer ends of the alignment posts 150 fix the position on the z axis, and the clamping mechanisms 53 fix the position on the y axis.

It should be noted that alignment plate 142 is preferably designed for each differently shaped work piece. Accordingly, the dimensions of the alignment posts 150 and stop 151 and their position on plate 142 may vary according to the part shape in order to accurately position and support each work piece.

It should also be noted that while the pallet described herein is designed to machine three sides of four work pieces in four machining strokes, the pallet could be modified to secure only one larger work piece by removing column 44 and the chucks 46 mounted thereon. By clamping the single work piece into position on the pallet and rotating the pallet the desired amount, a plurality of machining operations could be performed on the faces of the work piece.

Referring to FIGS. 2 and 3, a cube-like pallet alignment post support 153 is located near each corner of pallet 32. A pair of pallet alignment posts 154 and 155 are mounted on the outwardly facing vertical faces 156 of each pallet alignment post support 153. As will be explained below, each pair of alignment posts 154 and 155 serve to accurately align each pallet 32 with respect to a machining cell 350 during the machining operation. Alignment posts 154 and 155 can be mounted on the supports 153 with recessed socket head bolts 158 or other fastening means.

Alignment posts 154 are cylindrical with tapered ends 157. Alignment posts 155 are generally hexagonal in shape with the top and bottom surfaces 170 and 171 being arcuate. The corners 174—174 formed at the intersections of the flat sides 172 and 173 are closer to the center axis 175 of each post 155 than the top and bottom arcuate surfaces 170 and 171. Alignment posts 155 have tapered ends 176. By having each post 154 cylindrical and its cooperating post 155 hexagonally shaped as described, very accurate alignment of the pallet 32 is facilitated at the machining station 35.

Referring to FIG. 3, a clamping assembly indicated generally at 183 extends along and below each side 177 and 180 of pallet 32 parallel to the pallet's flow along straight sections 40 and 42 of track 31. Each clamping assembly 183 includes a pair of upper and lower elongated spacers 188 and 185, respectively. An elongated notched retainer 186 is secured to the underside of each lower spacer 185. Each retainer 186 is wider than the spacer 185 to which it is mounted and is centered with respect thereto. Consequently, a portion 187 of each retainer 186 extends beyond outer edge 190 of spacer 185 and a portion 191 extends beyond inner edge 192 of spacer 185. Rectangular notches 193 (FIGS. 2, 3 and 7) are located in sloped outer portion 187 near each corner of pallet 32 along sides 177 and 180.

The top surface of each inner portion 191 of each retainer 186 is beveled and a plurality of hardened triangular pieces 194 are welded or otherwise suitably secured to this beveled surface (FIGS. 3 and 7). The top surfaces of the triangular pieces 194 are horizontal and lie in a common horizontal plane and, in combination, provide an accurate clamping surface which will be described below.

Referring to FIG. 7, two parallel elongated flat hardened wear strips 197—197 are fixed to the bottom 184 of each pallet 32 parallel to sides 177 and 180 thereof. The wear strips 197 ride on the rollers 57 (FIG. 29) of track 31 when pallet 32 is in transit on the track.

One female pallet locator 201 is fixed to the bottom 184 of pallet 32 near one corner thereof with the lower face 202 of locator 201 flush with the lower face 203 of the adjacent wear strip 197. Locator 201 is accurately positioned within a notch 204 in wear strip 197 and a notch 205 in bottom 184 by forcing locator 201 against a short spacer 206 and a long spacer 207 inset in notch 205 by means of set screws 210. Locator 201 has a frusto-conical socket 211 located generally in its center.

A second female pallet locator 212 is located near the corner of pallet 32 diagonally across from locator 201 and is mounted in substantially the same manner as locator 201. Locator 212 is substantially identical to locator 201 except that the frusto-conical shaped socket 213 thereof is modified. The two sides of bore 213 located on a diagonal line from locator bore 201 are removed leaving two frusto-conical shaped annular sections 214—214 and two cavities 215—215.

Work Piece Loading Station

The work piece loading station can take any one of several different forms. A satisfactory type of work piece loading station will include a turntable in which each pallet can be supported and rotated around a vertical axis. In addition, an overhead hydraulic or pneumatic cylinder 102 (FIG. 30) with the lower end of the projecting piston rod 103 provided with a frusto-conically shaped socket 104 that will mate with the frusto-conically centering post 48 on pallet 32 (FIG. 2). A hydraulic cylinder 105 is horizontally oriented and the outer end of its piston rod has a plunger 106 positioned to act on the righthand side of a work piece and push the work piece towards the left as shown in FIG. 30 up against stop 151. A second horizontal hydraulic cylinder 107 has a piston rod which reciprocates in a direction perpendicular to the track section 40. The outer end of this piston rod has a plunger (not shown) which is similar to plunger 106 and engages the face of a work piece to push the same against the ends of the three projecting locating alignment posts 150 (FIGS. 2 and 3).

Further, a reciprocal diagonally oriented power driver 110 is located at the loading station and can be moved into coupling engagement with each top-jaw drive hub 140 (FIGS. 2 and 3) by the activation of a pneumatic cylinder (not shown). By operating this power drive 110 in the engaged position, the upper and lower clamping mechanisms 53 are closed against the upper and lower surfaces respectively of the work piece.

At the loading station a work piece will be placed either manually or automatically between the opened clamping mechanisms 53 so that it is in approximately the proper position to be machined. The above-mentioned cylinders 102, 105 and 107 and drive mechanism 110 are then actuated which accurately positions the work piece in its proper position to be machined at a machining station 35. As described above, cylinder 105 will force the work piece against the stop 151 thereby locating it accurately with respect to the x axis. Hydraulic cylinder 107 will engage the work piece and force it against the ends of the alignment pins 150 thereby locating the work piece accurately with respect to the z axis. When the driver 110 for the clamping mechanisms 53 is coupled to the drive hub 140 and actuated, the work piece is clamped between the opposing upper and lower clamping mechanisms 53 thereby locating the work piece accurately with respect to the y axis.

After the first work piece has been clamped into place on pallet 32, the turntable is rotated 90° and another work piece is loaded until four work pieces have been loaded onto the pallet. The pallet is now ready to be transferred from the loading station and advanced to the first machining station.

Pallet Locating, Securing and Rotating Mechanism

At each machining station 35 (FIGS. 1 and 13), pallets 32 are slid along track 31 onto cam followers 216 (FIG. 8) of known type which are located in notches 217 in the longer sides 218 of pallet locating, securing and rotating mechanism indicated generally at 220. Mechanism 220 comprises a first sub-assembly indicated generally at 221 (FIG. 9) and a second sub-assembly indicated generally at 222 indexably mounted thereon.

First sub-assembly 221 includes a frame 223 with a cylindrical center column 224 mounted thereto. The top portion of center column 224 is threaded. The outside diameter of center column 224 has a plurality of annular grooves 225—225 with O-ring seals 226—226 mounted therein. In addition, a plurality of annular hydraulic fluid carrying channels 227, 230 and 231 are located between O-rings 226. The upper portion 232 of column 224 is smaller in diameter than the main length of column 224 thus creating an annular shoulder 233. A washer 234 is forced against shoulder 233 by bushing 235 which is dimensioned so as to fit snugly around the upper portion 232 of column 224. Lower portion 236 of bushing 235 is larger in diameter than the upper portion 237 thus creating an annular lip 240.

A stationary piston 241 is generally disk shaped with a hole in the center dimensioned so as to snugly mate with bushing 235. Piston 241 is secured around the upper portion 237 of bushing 235 and forced against lip 240 by tightening nut 244 which is threaded on the end 245 of center column 224. Piston 241 has an annular channel 246 in its top surface and upper and lower annular grooves 250—250 around its outer perimeter with U-cups 251 mounted therein.

As shown in FIG. 11, worm 253 is supported for rotation within frame 223 by bearings 254 and 255. Motor 256, which is also supported by frame 223, drives worm 253 by way of coupling 257.

Second sub-assembly 222 (FIG. 9) has a body 260 with a vertical center bore 261 which is dimensioned to slidably and rotatably receive center column 224 and create a seal with O-rings 226. The splined exterior 262 (FIGS. 9 and 11) of lower sleeve-like portion 263 of body 260 interengages with the splined interior 264 of gear hub 265 of second sub-assembly 222. Because of the intermeshing splines, body 260 can slide vertically with respect to gear hub 265 without relative rotation therebetween. Worm gear 266, which meshes with and is driven by worm 253, is securely fixed to gear hub 265 by means of fasteners such as bolts. Consequently, worm 253 drives gear hub 265 and body 260 regardless of the vertical position of body 260.

The top portion 267 of bore 261 of body 260 is dimensioned so as to snugly receive piston 241 and its accompanying U-cups 251. Cover 270 is mounted on the top face 271 of body 260 to seal the top portion 267 of bore 261 and to create cavity 272. For illustrative purposes the body 260 is shown midway between its raised and lowered positions with respect to the piston 241.

Referring to FIG. 8, two vertically reciprocable male locators 275—275 are located at diagonal corners of the top 276 of pallet locating, securing and rotating mechanism 220. These locators 275 are located in the corners which correspond to the corners of pallet 32 in which locators 201 and 212 are located. Two vertically reciprocable clamping posts 277—277 are located at the remaining diagonal corners of the top 276 of mechanism 220.

Referring to FIG. 10, the constructions of male locators 275 and clamping posts 277 are shown in vertical section. Locator 275 is generally cylindrical with a piston-like lower portion 280 which is reciprocable in a cylindrical cavity 292 in body 260. Above piston portion 280, locator 275 includes a middle portion 283 having a relatively smaller diameter. The top end of locator 275 is frusto-conically shaped as indicated at 285 and dimensioned to mate with female locators 201 and 212 of pallet 32. A pair of circumferential grooves 286 with U-cups 287 mounted therein are located in the outer diameter of piston portion 280. Adjacent upper portion 285, the outer diameter of middle portion 283 has a circumferential groove 290 with an O-ring seal 291 mounted therein. The top portion 293 of cavity 292 has a relatively larger diameter in which the enlarged lower end of a bushing 294 is securely mounted. The inside diameter of bushing 294 is dimensioned such that middle portion 283 of locator 275 is reciprocable therein. Locator 275 as illustrated is raised and lowered by admitting and relieving hydraulic fluid on opposite faces of the piston portion 280. Other means for raising and lowering the locator are possible, such as, for example, it could be raised by a hydraulic fluid and lowered by a spring mechanism. Such a mechanism has been shown for illustration purposes with respect to clamping post 277.

Clamping post 277 is cylindrical with an annular portion removed from its bottom surface as indicated at 298. The clamping post 277 has two circumferential grooves 297 and 300 which have an O-ring seal 301 and a U-cup seal 302 mounted therein, respectively. Bushing 303 is fixedly mounted within bore 304 in body 260 and bore 305 in cover 306. The inside diameter of bushing 303 is dimensioned such that clamping post 277 is slideably mounted within bushing 303. Lower portion 307 of bushing 303 has an outside diameter smaller than the diameter of bore 304 creating an annular cavity 310 therearound. Clamping post 277 has a flat top surface 308 with a stepped center bore 312. Bolt 313 extends downwardly through the bore 312 and is screwed into a threaded hole in body 260. A compression spring 315 is secured between the underside of a washer 314 and a shoulder 318 in the bore 312. Upon relieving the hydraulic pressure on the bottom of the clamping post 277, the compressive force of spring 315 urges clamping post 277 to its retracted position.

Second sub-assembly 222 is supported for rotation within first sub-assembly 221 by means of bearings 317 and 320 (FIGS. 9 and 10). Upper bearing 317 is secured in place between retainer ring 321 and the lower half 322 of a curvic coupling indicated generally at 323. Retainer ring 321 is fixed to second sub-assembly 222 while the lower half 322 of curvic coupling 323 is fixed to first sub-assembly 221. Lower bearing 320 is secured in place by retainer ring 324, gear hub 265 and retainer ring 325. Gear hub 265 has a circumferential groove 326 which is formed and arranged so as to receive bearing 320. Retainer ring 325 is fixed to the lower surface 327 of gear hub 265 in order to secure lower bearing 320 to second sub-assembly 222 while retainer ring 324 is fixed to first sub-assembly 221 to secure bearing 320 to first sub-assembly 221.

Relative rotation between first sub-assembly 221 and second sub-assembly 222 is prevented by the curvic coupling 323. Curvic coupling 323 includes a lower half 322 which is fixed to first sub-assembly 221 as described above and an interengaging upper half 330 which is secured to second sub-assembly 222. Both lower half 322 and upper half 330 have seventy-two teeth which consequently allow the coupling to be locked in 5° increments. If desired, a different number of teeth could be used in order to obtain different rotational locking increments.

Vertical movement of second sub-assembly 222, vertical movement of locators 275 and clamping posts 277, and the operation of air checks 333—333 are controlled by a hydraulic system which includes a series of channels within first sub-assembly 221 and second sub-assembly 222. Vertical channel 334, through which hydraulic fluid acts to force second sub-assembly 222 upward, extends through the bottom of first sub-assembly 221, up through the center of center column 224 and exits into cavity 272 above piston 241. Vertical channel 335 (FIG. 10) enters through the bottom of first sub-assembly 221 and extends up through center column 224 and joins horizontal channel 336 just below the bottom of bushing 235. Horizontal channel 336 extends outward from vertical channel 335 to the outer edge of center column 224 thus connecting channel 335 with the cavity 272 below piston 241. Hydraulic fluid forced through channels 335 and 336 and into cavity 272 forces second sub-assembly 222 downward, thus forcing upper half 330 of curvic coupling 323 into locking engagement with mating lower half 322 mounted on first sub-assembly 221.

A series of additional vertical channels (not shown) extend upward through the bottom of first sub-assembly 221 into center column 224. These channels carry the hydraulic fluid to additional channels to be described for controlling the locator 275, the clamping post 277 and the air check mechanisms 333. Although pallet locating, clamp and securing mechanism 220 has two of each of the aforementioned locators 275, 277 and 333, it will suffice to describe only the channels necessary to activate one of each of the mechanisms.

Annular hydraulic fluid carrying channel 227 is connected to a vertical channel (not shown) within column 224 by a horizontal channel (not shown). A short slanted channel 337 within lower portion 263 of base 260 connects annular channel 227 to vertical channel 340. Long slanted channel 341 extends from vertical channel 340 to the top surface 271 of second sub-assembly 124 where a second slanted channel 342 extends downward therefrom connecting slanted channel 341 with lower region 339 of bore 292. Hydraulic fluid forced through this network of channels and into region 339 of bore 292 forces locator 275 upward.

A second short slanted channel (not shown) within lower portion 263 of base 260 connects annular channel 227 to vertical channel 343. A second long slanted channel 344 extends from vertical channel 343 to cavity 310. Hydraulic fluid forced through this channel network causes fluid to enter into cavity 298 and forces clamping post 277 upward.

Annular channel 230 is connected to another vertical channel (not shown) within center column 224 by a horizontal channel (not shown). Long slanted channel 345 extends from the annular channel 230 to the portion of bore 292 just below bushing 294. Hydraulic fluid forced through this channel network and into the top portion of bore 292 above piston-like lower portion 280 forces locator 275 downward.

Air check 333 utilizes the remaining annular channel 231 located around center column 224. Still another vertical channel (not shown) within column 224 is connected to annular channel 231 by a horizontal channel (not shown). A short horizontal channel 346 within lower portion 263 of base 260 connects annular channel 231 to a vertical channel 348 (FIG. 8). A slanted channel 347 extends from vertical channel 348 to air check 333. Air forced through this channel network and up to air check 333 is utilized to signal whether a pallet 32 is properly secured on mechanism 220.

Annular channels 227, 230 and 231 are dimensioned such that upon raising second sub-assembly 222, slanted channel 337, second slanted channel (not shown), long slanted channel 345 and horizontal channel 346 are still in hydraulic communication with their respective annular channels 227, 230 and 231.

The location of second sub-assembly 222 as between its raised and lowered positions is monitored by a pair of switch assemblies 331 and 332 (FIG. 9) of known type which are mounted on first sub-assembly 221.

Machining Cell

In addition to a pallet locating, securing and rotating mechanism 220, each machining station 35 includes a machining cell 350 (FIG. 1). Each machining cell 350 includes a fixed base 351 (FIGS. 12 and 13), a rotatable drive turret 352 and four machine heads 353 removably mounted thereon. In the embodiment shown, machining cell 350 has four sides. Spindle drive side indicated generally at 377 faces pallet locating, securing and rotating mechanism 220 (FIG. 1). Machine head replacement side indicated generally at 378 faces the direction opposite spindle drive side 377, towards machine head storage rack 38. Storage sides indicated generally at 379 and 380 are positioned rotationally intermediate spindle drive side 377 and machine head replacement side 378.

Base 351 (FIG. 12) includes a support 355 for a turret rotation motor 356 mounted thereon. A sprocket 354 positioned below turret rotation motor 356 is fixed to the motor shaft 359 and driven thereby. Encoder 357 is mounted below the sprocket and monitors the rotation of motor 356 in known manner. Sprocket 354 drives another sprocket 358 (FIGS. 13 and 14) by means of a synchronous timing belt (not shown). Sprocket 358 is keyed to shaft 360 (FIG. 14) which is rotatably supported within base 351 by means of bearings 361 and 362. Pinion 363 is securely fixed to the top portion of shaft 360 and drivingly engages ring gear 364 (FIG. 15).

Ring gear 364 (FIGS. 14–16) is securely mounted to the lower surface 365 of drive turret 352 and normally rests on the smooth upper surface 366 of base 351. Ring gear 364 has a annular channel 367 in its bottom surface 370 into which air can be forced in order to create an air bearing. The bottom surface 370 of ring gear 364 is releasably secured to the top surface 366 of base 351 by the action of two pairs of vertically slidable generally cylindrical posts 371, a representative example of one of such posts is depicted in FIG. 16.

As each pair of posts 371 and their "drive" assembly are substantially identical, only one shall be described herein. Each post 371 is slideably supported by a pair of bushings 372 which are mounted within base 351. As shown in FIGS. 14 and 16, post 371 has an upper notch 373 facing the center of ring gear 364. Upper notch 373 is dimensioned so as to be somewhat taller than the thickness of ring gear 364. In normal operation, the top horizontal face 374 of upper notch 373 is forced down onto the top outer edge 375 of ring gear 364 by the acutation of hydraulic cylinder 376.

Each pair of posts 371 is moved vertically to clamp and unclamp ring gear 364 by the movement of a single hydraulic cylinder 376 which is securely mounted to base 351. The upper end of its piston rod 381 passes through yoke 382 and through rod end bearing 383. Actuation of the hydraulic cylinder 376 moves yoke 382 vertically while piston rod 381 slides through the rod end bearing. Through such a construction, yoke 382 can tilt while it is moved vertically.

A pair of concentric shafts 385 are rotatably mounted end-to-end within base 351 adjacent hydraulic cylinder 376. Each shaft is fixed to one end of lever 386 so that each shaft 385 and lever 386 pair can rotate as a unit about the central axis 387 of shafts 385. The opposite ends of levers 386 are connected to yoke 382 by means of a suitable bearing or joint assembly whereby vertical movement of yoke 382 will cause lever 386 to rotate about axis 387 without any binding between the yoke 382 and lever 386. Such an assembly could include a downwardly depending member which extends from the yoke 382 to a spherical bearing which is mounted on the outer end of levers 386.

The outside ends of shafts 385 are each provided with a short eccentric portion 388 of smaller diameter which have an axis indicated at 389. A cube-shaped shoe 471 having a bore dimensioned to rotatably receive eccentric portion 388 is mounted thereon. Shoe 471 is dimensioned to horizontally slide within a lower notch 472 in post 371. Shaft 385, eccentric portion 388, shoe 471 and lower notch 472 are all constructed and arranged so that the rotation of shaft 385 about its axis 387 causes shoe 471 to move vertically while it slides horizontally within lower notch 472. Such a construction will cause post 371 to likewise be moved vertically to clamp or unclamp ring gear 364.

Spindle drive motor 390 (FIG. 12) is mounted to the side of base 351 opposite turret rotation motor 356 on a pair of brackets 391 and 392. Spindle drive motor 390 is supported by adjustable bar 393 which is fixed to bracket 392 positioned beneath spindle drive motor 390. The opposite end of adjustable bar 393 is mounted to bracket 394 which is mounted to the side of base 351. Sprocket 395 is fixed to motor shaft 396 and drives sprocket 397 by means of a synchronous timing belt 398. Sprocket 397 is keyed to and drives horizontal shaft 400. Shaft 400 is supported for rotation within base 351 by a pair of bearings 499. Beyond sprocket 397 in a direction away from base 351, a relatively smaller sprocket 401 (FIG. 13) is also securely mounted on shaft 400. This smaller sprocket 401 drives an encoder and feed back unit 402 by means of a synchronous timing belt 403.

Sprocket 404 (FIG. 15) is securely mounted on shaft 400 near the center of base 351. Sprocket 404 drives sprocket 405 (FIG. 14) by means of a synchronous timing belt (not shown) which extends upwardly from sprocket 404 to sprocket 405. Sprocket 405 is securely fixed to stepped spindle drive shaft 406 which is rotatably mounted within center column 407 of machining cell 350. Spindle drive shaft 406 is supported for rotation within column 407 by a pair of bearings 410 and 411. The output or drive end 412 of drive shaft 406 has a keyway 413 with a drive key 414 fixed therein.

Column 407 (FIGS. 14 and 17) is generally cylindrically shaped and is securely fixed to the center of base 351 and extends up through the center of drive turret 352. Three flat horizontally positioned annular key sections 416, 417 and 420 are mounted to uprights 421 which are located around column 407. Uprights 421 are in turn secured to brackets 422 which are mounted to column 407. Keys 416, 417 and 420 extend substantially around column 407 except for the section where drive shaft 406 and its drive key 414 are located. Keys 416, 417 and 420 and drive key 414 are situated so as to form a substantially continuous circular horizontal key while drive turret 352 is being rotated.

An upper frame 423 (FIG. 14) is secured to the top of center column 407. Turret alignment assembly 424 is mounted on the spindle drive side 377 of frame 423 while machine head release assembly 425 is mounted on the machine head replacement side 378 (FIG. 1). A cylinder 426 for driving the air check nozzle is mounted at the right side of machine head replacement side 378.

Referring to FIG. 18, turret alignment assembly 424 includes a hydraulic cylinder 427, the activation of which forces shaft 428 downward. The lower end of shaft 428 is of reduced diameter and is fixed into bore 430 of alignment bar 431. Bar 431 has opposed flat sides 432 and 433 and a tapered lower end 434. Flat guide rollers 435—435 contact side 432 of bar 431 and are rotatably mounted to cover plate 436 which is securely fixed to upper frame 423. Flat guide rollers 437—437 contact side 433 of bar 431 and are rotatably fixed to adjustable block 440. Block 440 is adjusted by use of adjustment screws 441. By adjusting rollers 437, bar 431 is preloaded so it will move freely with zero side clearance. Upon actuating cylinder 427, the tapered lower end 434 of bar 431 is forced downward and into contact with opposing tapered alignment blocks 442—442 which are securely mounted at the sides of notch 443 in the top surface 444 of each vertical face 445 of drive turret 352. Blocks 442 are constructed and arranged such that the downward movement of bar 431 wedges or forces drive turret 352 into the exact desired rotational alignment.

Machine head release assembly 425 (FIG. 12) includes a hydraulic cylinder 446, the activation of which forces rod 447 upward. Clevis 450 is fixed to the lower end of rod 447. The arms of clevis 450 (FIGS. 12, 31 and 32) straddle cross-head 452 and a clevis pin 451 is fixed to the arms and through a hole in cross-head 452. Both ends of cross-head 452 have an upper vertical face 453 and a lower vertical face 449. Upper vertical face 453 slants back from the outer face 459 of cross-head 452 towards the edge of the rear face 448 of cross-head 452. This upper vertical face 453 is dimensioned so that it will not make contact with the top inner edge 468 of securing posts 455 while drive turret 352 is rotated. Lower vertical face 449 slants back from the outer face 459 towards the sidewall 469 of cross-head 452 so that the lower vertical face 449 is approximately parallel to upper vertical face 453. However, the plane of lower vertical face 449 is further away from the rear face 448 of cross-head 452 so that lower face 449 projects into the notch 456 of securing post 455. This projection creates an upwardly facing horizontal ledge 457.

Drive turret 352 has four identical vertical sides 445—445 (FIG. 12). Each side 445 has a large rectangular opening 458 and round alignment bushings 460 and 461 located in holes to the left and right of opening 458. The axes of bushings 460 and 461 lie on a horizontal plane. A bolt 516 is securely fixed in the top right-hand corner of opening 458. Vertical side 445 also has four counterbores 462 with contact bolts 463 mounted therein. Each bolt 463 has a small axial aperture (not shown) through which air can be forced. Two parallel cylindrical securing posts 455—455 extend vertically downward through each vertical side 445. Each post 455 is slideably supported within side 445 by a pair of bushings (not shown). Each post 455 extends down through a hole (not shown) in the top of its respective alignment bushing 460 or 461 and into center of the bushing. The bottom portion 466 of post 455 is tapered to create a slanted portion 467 (FIG. 22) which operates as a wedge to interact with a portion of the machine head 353 in order to secure the machine head to the vertical face 445 of the turret as will be further described herein. Posts 455 are spring loaded so as to be biased in a downward position.

The top portion of post 455 has a transverse notch 456 (FIGS. 12 and 14) which approximately faces the center of column 407. Notch 456 has a sufficient depth such that upon rotation of drive turret 352, notch 456 does not contact the lower vertical face 449 (FIGS. 31 and 32) at the ends of cross-head 452. The upper horizontal surface 465 of notch 456 is of sufficient width so as to securely contact upwardly facing horizontal ledge 457 located between upper vertical face 453 and lower vertical face 449 in order to raise posts 455 upon the retraction of cylinder 446.

Machine Head

Figure 21:
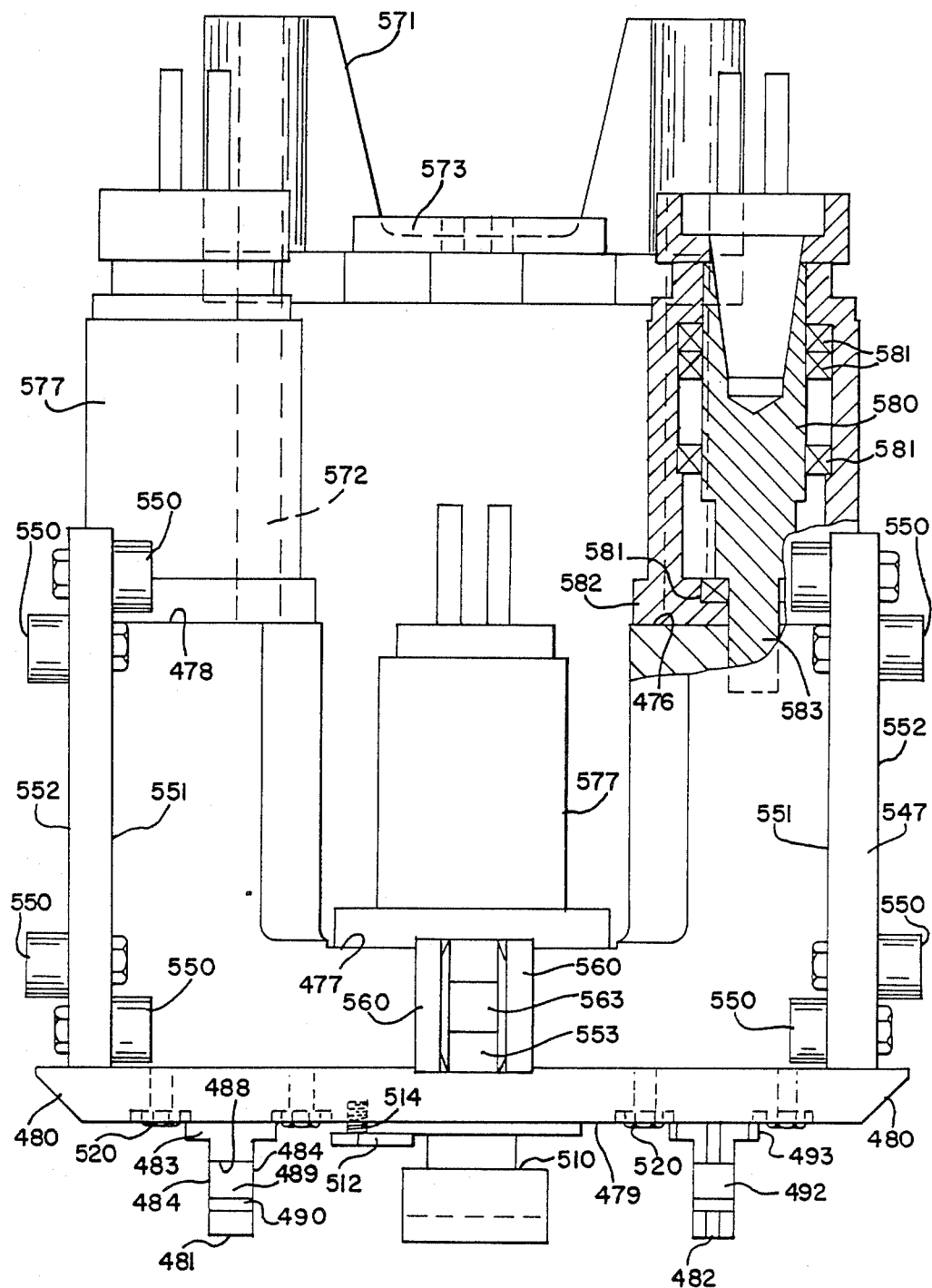
FIG. 21 is a top plan view partly broken away of the machine head of FIG. 19 showing boring pots, partly in section, and the pallet alignment assembly.

One machine head 353 (FIGS. 1, 13 and 21) is removably mounted to each vertical face 445 of drive turret 352. Machine head 353 is generally U-shaped and has three forward facing vertical faces 476, 477 and 478 (FIGS. 13 and 21) and a rear face 479 (FIG. 19). Rear face 479 is rectangular and is approximately the same size as each vertical face 445 of drive turret 352 except that the width of machine head 353 is slightly larger than that of vertical face 445. Consequently, in order to facilitate the mounting of four machine heads 353 on drive turret 352 simultaneously, the ends of rear face 479 are beveled or mitered as indicated at 480 (FIG. 21).

Two cylindrical alignment posts 481 and 482 (FIG. 19) are securely mounted to the rear face 479 of machine head 353. Alignment post 481 is preferably manufactured from a single cylindrical piece and has a cylindrical section 483 adjacent to rear face 479 which is dimensioned to fit snugly within alignment bushing 461. The remaining generally cylindrical length of alignment post 481 is machined so as to have a pair of vertical sides 484, a pair of generally arcuate top and bottom surfaces 486 and 487, respectively, and an intermediate notch 485 (FIG. 22). Notch 485 has a vertical face 488, a horizontal lower face 489 and a sloped face 490. Face 490 interacts with slanted portion 467 of securing posts 455 in a wedge-like manner in order to force and secure machine head 353 into its mounted position.

Alignment post 482 is substantially identical to alignment post 481 with regard to having two vertical sides 491 and an identically shaped notch 492. However, the portion 493 adjacent rear face 479 of machine head 353 is generally octagonally shaped with sides 494 being arcuate and dimensioned so as to fit snugly within alignment bushing 461. The remaining portion of alignment post 482 is octagonally shaped with vertical sides 491 being longer than any of the other sides. Notch 492 in post 482 has substantially the same shape as notch 485 of post 481 and is located in a similar position and serves a similar purpose.

Machine head drive shaft 500 (FIG. 22) is supported for rotation within machine head 353 by bearings 501 and 502. The drive end 503 of shaft 500 is relatively larger than the rest of shaft 500 and has a transverse notch 504 located on its outer face 505. Two parallel hardened keys 506 (FIGS. 19 and 22) are fixed within notch 504 in such a manner so as to create a hardened keyway 507. The inner face 510 of drive end 503 has two diametrically opposed notches 511 (FIG. 19) located therein such that when desired, rectangular stop 512 can engage either of the notches 511 and cause keyway 507 to be fixed in a horizontal orientation. Stop 512 is fixed to shaft 513 (FIGS. 19 and 21) which is slideably mounted within machine head 353. A compression spring 514 is located between the stop 512 and the rear face 479 of machine head 353 thus biasing stop 512 towards engaging one of the notches 511. Consequently, shaft 500 will be locked with keyway 507 in a horizontal orientation unless stop 512 is retracted. This feature is especially useful during removal and replacement of the machine heads 353 on turret 352 as will be apparent from the description below.

In order to retract stop 512 and thus unlock shaft 500, bolt 516 (FIG. 12) is securely fixed and positioned at the edge of the opening 458 in face 445 of drive turret 352 so as to contact stop 512 and force it away from the inner face 510 and notches 511 of shaft 500. Shaft 500 could then freely rotate when machine head 353 is mounted on vertical face 445 of drive turret 352 except that keys 416, 417 and 420 and drive key 419 engage keyway 507 and prevent free rotation of the shafts 500 which engage the keys 416, 417 and 420 by maintaining keyways 507 in a horizontal position. Additionally, the shaft 500 engaging drive key 419 can only rotate when spindle drive shaft 406 (FIG. 14) is driven.

If desired, the keys 416, 417 and 420 and bolts 516 could be eliminated whereby stop 512 would engage and lock each shaft 500. The spindle drive side 377 of turret 352 would then be provided with means for retracting the stop 512 of the machine head 353 located on that side. After the machining operation, the stop would re-engage the shaft 500 so that all shafts are locked. The turret 352 could then be rotated and the unlocking, machining and re-engaging operations could then be repeated. A hydraulic or pneumatic cylinder could be used for this purpose.

The rear face 479 (FIG. 19) of machine head 353 has four counterbores 517—517 with contact bolts 520 mounted therein. These contact bolts 520 are positioned so as to line up with and contact the contact bolts 463 of the vertical faces 445 of drive turret 352 when machine head 353 is properly mounted.

As shown in FIG. 20, drive gear 523 is fixed to machine head drive shaft 500 and drivingly engages a first idler gear 524 and second idler gear 525. First idler gear 524 drivingly engages center driven gear 526 and right driven gear 527. Second idler gear 525 is in driving engagement with left driven gear 530. As a result of this configuration, center driven gear 526, right driven gear 527 and left driven gear 530 all rotate in the same direction. Drive gear 523 has a splined interior which matingly engages the splined exterior of shaft 500. First idler gear 524 and second idler gear 525 are both mounted and supported for rotation in a similar manner on their respective shafts within machine head 353.

Right driven gear 527 has an internally splined bore which matingly engages the splined exterior of one end 533 of output shaft 534. Shaft 534 is supported for rotation within machine head 353 by bearings 535 and 536 at end 533 and by bearing 537 at the opposite end 540. Output shaft 534 extends from just inside rear face 479 of machine head 353 to front face 478. The end 540 of shaft 534 near front face 478 has an internally splined bore. Left driven gear 530 is supported by and drives output shaft 541 in substantially the same manner. Center driven gear 526 and its output shaft 542 are also constructed in a substantially identical manner except that output shaft 542 is substantially shorter than shafts 534 and 541 because 542 shaft only extends from rear face 479 to center front face 477.

A pallet alignment assembly receptacle 543 (FIG. 22) is located near the bottom of right front face 478 and left front face 476 of machine head 353. Each receptacle 543 includes a bore 544 with a compression spring 545 mounted therein. An outer sleeve 546 is located in bore 544 adjacent front faces 476 and 478 of machine head 353.

Pallet alignment assembly indicated generally at 570 (FIGS. 13 and 21) includes a frame 571 attached to a pair of parallel alignment shafts 572. Shafts 572 are parallel to the axes of output shafts 534, 541 and 542 and are dimensioned so as to slidingly engage pallet alignment assembly recepticles 543. A bushing plate 573 with hardened bushings 574, which are positioned to line up with machine tools driven by center output shaft 542, is also mounted to frame 571. Frame 571 has two round bores 575, each of which are coaxial with and dimensioned to snugly mate with alignment posts 154 and 155 located on pallets 32.

Two parallel upper arms 547—547 (FIGS. 19-22) are fixedly mounted to the upper surface 548 of machine head 353 adjacent its outer edges. These arms are parallel to the axes of the output shafts 534, 541 and 542. Two cam followers 550—550 are mounted on each of the two long vertical sides 551 and 552 of arms 547. The two cam followers 550 mounted on the inner side 551 of each arm 547 are positioned further apart than the two followers 550 mounted on the outer side 552 of each arm 547.

Machine head removal bracket 553 is also mounted to the upper surface 548 of machine head 353. Bracket 553 is securely mounted between two bosses 560—560. As viewed in FIG. 19, bracket 553 has an inverted T shape. As shown in FIG. 21, the leg portion 562 of bracket 553 has a transverse notch 563 located therein.

A variety of tools and tool driving assemblies can be mounted on vertical front faces 476, 477 and 478 of machine head 353. One option utilizes mounting one boring pot 577 (FIGS. 13 and 21) on each vertical front face 476, 477 and 478. A multiplicity of tools can be driven by the spindle drive shaft 580 of each boring pot in known manner. As shown in FIG. 21, boring pot 577 includes a shaft 580 which is supported for rotation within boring pot 577 by bearings 581—581 which are mounted in frame 582 of boring pot 577. Inner end 583 of shaft 580 is externally splined and dimensioned so as to matingly engage the internal splines in the end of the output shafts 534, 541 or 542 within the machine head 353.

Pallet Shuttle Mechanism

Figure 25:
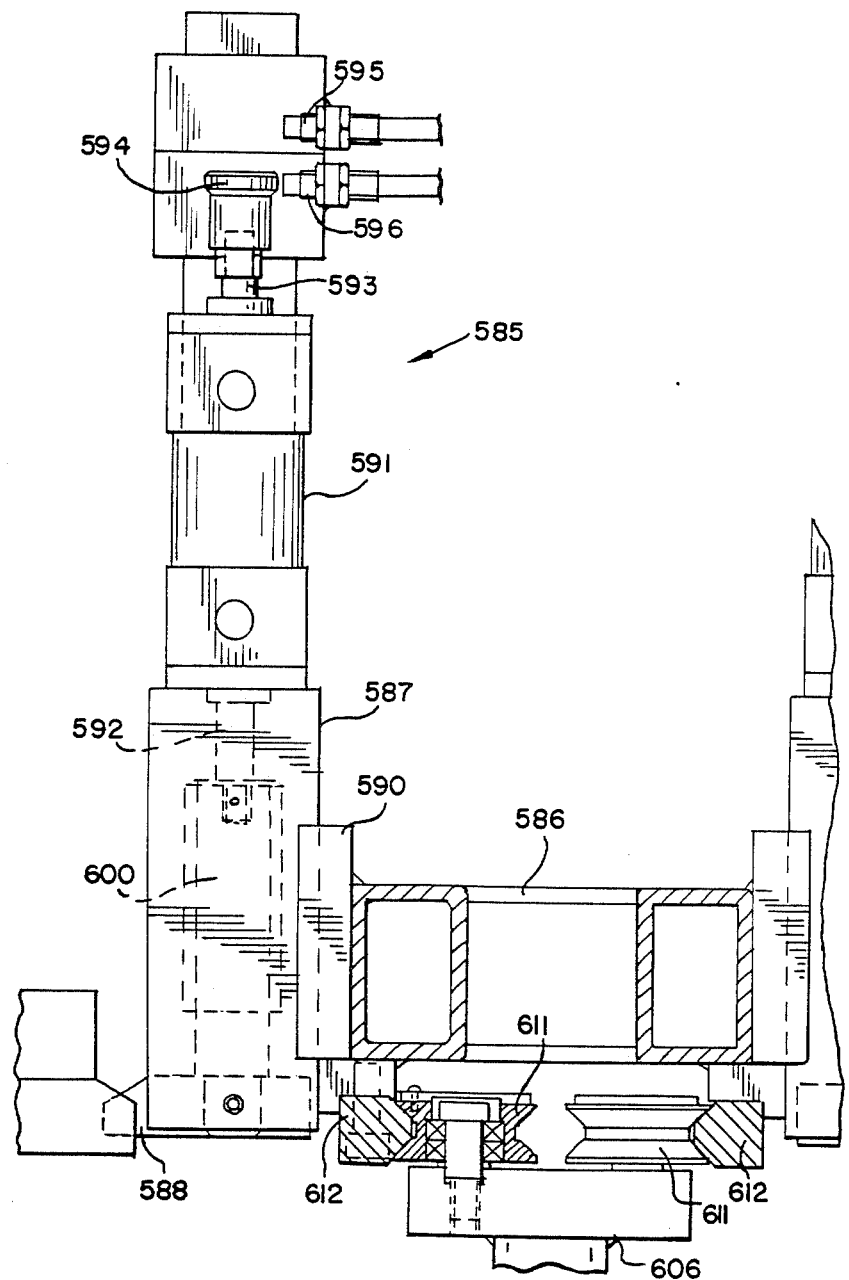
FIG. 25 is a detail side elevational view of one of the hydraulically controlled finger mechanisms shown in FIGS. 23 and 24.

Pallet shuttle mechanism indicated generally at 584 (FIGS. 23 and 24) includes a plurality of hydraulically controlled finger mechanisms 585 (FIG. 25) which are mounted on a frame 586 which is slidably positioned between sections 40 and 42 of track 31. Each finger mechanism 585 includes a hollow vertical housing 587 mounted to bracket 590 which in turn is mounted to frame 586. Actuation of double-ended hydraulic cylinder 591 mounted to the top of housing 587 reciprocates lower piston rod 592 and upper piston rod 593. A switch dog 594 is securely mounted to the top of upper piston rod 593. Switches 595 and 596 sense the location of switch dog 594 in order to determine the position of hydraulic cylinder 591. Shaft 600, which is fixed to the lower end of lower piston rod 592, reciprocates within housing 587. Laterally projecting finger 588 is securely mounted to the lower end of shaft 600. Finger 588 is dimensioned so as to slidingly engage notches 193—193 located in sides 177 and 180 of pallet 32. Upon extending hydraulic cylinder 591, both piston rods 592 and 593 are forced downward causing finger 588 to engage notch 193 of pallet 32.

As shown in FIGS. 23 and 24, six finger mechanisms 585—585 are located on each side of frame 586. Each of these mechanisms 585 is substantially identical except that two, 585a and 585b, have a differently shaped finger 588a and 588b. Fingers 588a and 588b of mechanisms 585a and 585b are L-shaped as opposed to the straight finger 588 of mechanism 585. Additionally, fingers 588a and 588b project from the side 602 of housing 587 of finger mechanisms 585a and 585b rather than projecting from the front 603 of housing 587 of finger mechanism 585.

An elongated hydraulic cylinder 605 is secured to main frame 606. The outer end 607 of piston rod 610 thereof is attached to frame 586 of shuttle mechanism 584. By actuating hydraulic cylinder 605, frame 586 and the finger mechanisms 585 mounted thereon are reciprocated parallel to sections 40 and 42 of track 31. Frame 586 is slideably supported on main frame 606 by V-shaped rollers 611—611. V-shaped guides 612 are mounted to frame 586 and are constructed and arranged so as to slidingly engage rollers 611.

Straight short sections 41 and 43 (FIG. 1) are actually identical mechanisms (FIG. 29) for transferring pallets between adjacent ends of long sections 40 and 42 of track 31. These mechanisms 641 include a hydraulic cylinder 642 mounted to main frame 606. The free end of the piston rod 643 is attached to a sub-frame 644 which has a pair of rails 645—645 mounted thereon. These rails 645 are substantially identical to the rails 49 of sections 40 and 42 of track 31. This sub-frame 644 is slideably supported on main frame 606 by a pair of parallel shafts 646—646 mounted thereon. The sub-frame 644 has linear bearings (not shown) mounted thereon which are dimensioned so as to slide on parallel shafts 646. Switches 647 are mounted on frame 606 at opposite ends of the cylinder 642 stroke in order to signal the precise alignment of rails 645 with rails 49 and pallet locating, securing and rotating mechanism 220, respectively. The switches 647 are contacted by dogs 648 mounted on sub-frame 644.

Machine Head Replacement Mechanism

Figure 26:
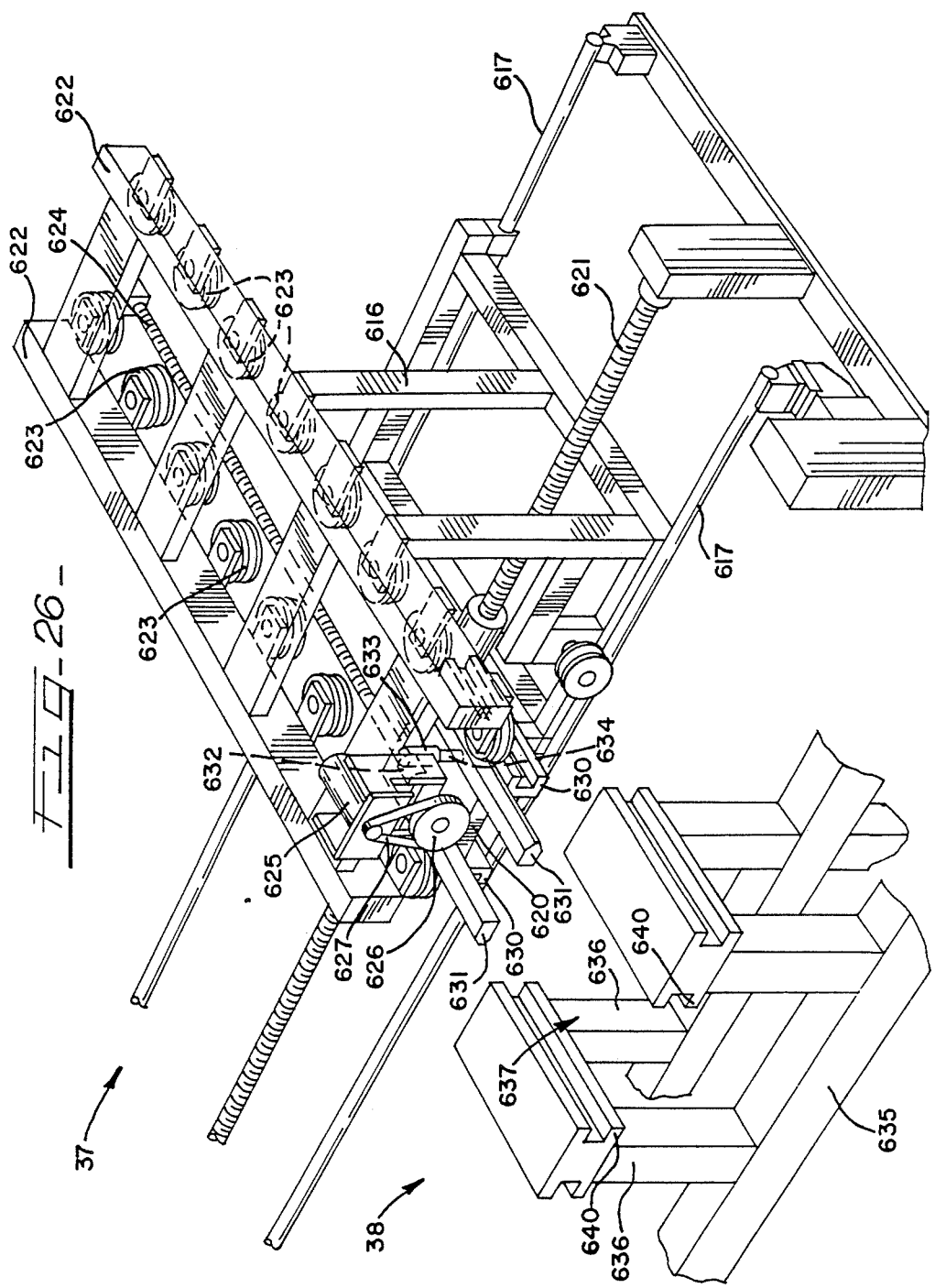
FIG. 26 is a perspective view of the machine head replacement mechanism and the machine head storage rack forming two elements of the system of FIG. 1.

Machine head replacement mechanism indicated generally at 37 (FIG. 26) includes a sub-frame 616 slidably mounted on a pair of fixed rails 617 and a carriage 620 slidably mounted on first sub-frame 616. Sub-frame 616 has a series of bearings (not shown) adjacent to its bottom portion mounted parallel to rails 617 so as to support sub-frame 616 for sliding on rails 617. A motor (not shown) is mounted to sub-frame 616 and drives a threaded collar (not shown) which fits onto fixed threaded shaft 621. By rotating the collar while shaft 621 remains fixed, sub-frame 616 can be moved along rails 617 in opposite directions. The upper portion of sub-frame 616 includes two parallel carriage support members 622 which are oriented perpendicularly to rails 617. Each carriage support member 622 carries on its underside a plurality of inwardly extending V-shaped rollers 623 mounted along the length thereof. A pair of parallel V-shaped guides 631 are mounted to the top of carriage 620 and are arranged such that they mate with and slide on V-shaped rollers 623 so as to support carriage 620.

Threaded shaft 624 is rotatably mounted on sub-frame 616 parallel to and centered between carriage support member 622. A motor 625 is mounted to sub-frame 616 and drives threaded shaft 624 by means of sprocket 626 and synchronous timing belt 627. A threaded collar 632 is located on threaded shaft 624 and fixedly mounted to carriage 620 such that the rotation of shaft 624 causes carriage 620 to be reciprocated in a direction perpendicular to the direction of travel of sub-frame 616 along roller 623.

Carriage 620 has a pair of parallel horizontal channels 630 mounted on its outside edges which are constructed and arranged so that the cam followers 550 (FIGS. 19-22) located on the inner sides 551 of each arm 547 of machine head 353 can slide into and be supported by the channels 630. A hydraulic cylinder 633 is also mounted on carriage 620. This cylinder is used to force a post 634 downward so that the end of the post can matingly engage notch 563 in machine head removal bracket 553 and thus secure machine head 353 to carriage 620.

Machine Head Storage Rack

Machine head storage rack indicated generally at 38 (FIG. 26) includes a frame 635 with a plurality of upright columns 636 mounted at evenly spaced intervals thereon to create a plurality of machine head storage areas 637. The frame and columns mounted thereon are deeper than the length of a machine head 353 with boring pots mounted thereto. A channel 640 is mounted horizontally along the top of both sides of each column 636. The columns 636 and channels 640 are positioned such that the cam followers 550 located on the outer sides 552 of arms 547 of machine head 353 can slide into and be supported by the channels in order to support machine head 353 during storage thereof.

Operation

In operation, a pallet 32 is transferred from wash station 34 or change-over area 36 and approximately positioned at loading/unloading station 33. The vertical hydraulic cylinder and plunger assembly 102 located at the loading/unloading station 33 is extended causing socket 104 to travel downward and engage the frustoconically shaped centering post 48 mounted on the top of pallet 32, thus clamping the flat hardened surfaces 197 of pallet 32 down onto a turntable located at loading/unloading station 33.

A work piece is then loaded, either automatically or manually, between upper clamping mechanism 53 and lower clamping mechanism 53. The horizontal hydraulic cylinder and plunger assembly 105 which is located parallel to section 40 of track 31 is extended forcing work piece up against the inner contact surface 149 of stop 151. A second horizontal hydraulic cylinder and plunger assembly 107 which is perpendicular to section 40 of track 31 is then extended forcing work piece against the outer faces of alignment posts 150. While the work piece is being loaded and clamped into position by the hydraulic cylinder assemblies, the reciprocable rotational drive mechanism 110 is forced downward along the axis of jaw drive shaft 137 by a hydraulic cylinder (not shown) so that the socket 111 located at the lower end of the mechanism 110 110 engages drive hub 141. Once the work piece has been properly positioned, the drive mechanism 110 rotates the drive hub 141 in a direction so as to force the upper and lower top-jaw mounting members 62 and the clamping mechanisms 53 mounted thereon toward each other until work piece is secured into position between these mechanisms.

All of the aforementioned hydraulic cylinders are then retracted. The section of track 31 at loading/unloading station 33 and the pallet 32 mounted thereon are rotated 90° in order to present another pair of clamping mechanisms 53 for unloading and then loading. The clamping procedure as outlined above is then repeated and the pallet again rotated until work pieces have been mounted on all four sides of pallet 32.

It should be noted that a machined work piece is unclamped by reversing the rotation of the drive mechanism to loosen clamping members 53. This unloading procedure can be performed for each work piece at the loading/unloading station 33 immediately prior to the loading of a work piece or all work pieces can be unloaded at a separte unloading station. The unmachined work pieces can then be mounted as described above.

After loading, pallets 32 are non-sychronously transferred along track 31 in a counterclockwise direction (FIG. 1) in a manner described below, until the first or leading loaded pallet 32 arrives at the first machining station 35. Additional machining stations or other types of work stations can be provided along track section 40 or along section 42 if same were extended. At machining station 35, pallet 32 slides onto pallet locating, securing and rotating mechanism 220. A signal is sent from the main computer 650 to a hydraulic system which forces hydraulic fluid from a reservoir through a first series of channels and into annular channel 227. The hydraulic fluid travels from channel 227 through channels 337, 340, 341, and 342 and into region 339 of bore 292 forcing both male locators 275 upward, one into round female locator 201 and the other into relieved female locator 212, thus accurately positioning pallet 32 on mechanism 220. At the same time, hydraulic fluid is forced from channel 227 through channels 343 and 344 and into cavity 298 which forces clamping posts 277 upward. The top surface 308 of each clamping post 277 makes contact with the bottom surface 184 of pallet 32 forcing pallet 32 upwards until the top horizontal clamping surface 196 of triangularly shaped section 194 is forced up against the bottom 268 of locating, securing and rotating mechanism 220. As a result, parallel flat surfaces 197 no longer make contact with the top surface of cam followers 216.

Once a pallet 32 is located and clamped into position on mechanism 220, air is forced through a second series of channels in center column 224 and up into annular channel 231. The air travels through various channels including channels 346 and 347 up to air check 333. If the pallet 32 is properly located and clamped on mechanism 220, the hardened wear surfaces 197 of pallet 32 will be raised up off of the top of mechanism 220. Thus air should pass freely through air check 333. If, however, air does not escape, an increase in pressure will occur and an appropriate signal will be sent by the main computer 650 alerting the operator of the problem.

If the air check indicates that the pallet is properly located, spindle drive motor 390 of machining cell 350 is then energized which causes sprocket 395 to drive timing belt 398 which in turn rotates sprocket 397. As a result, shaft 400 is rotated thus causing the rotation of sprocket 404. A timing belt (not shown) is driven by sprocket 404 and drives sprocket 405 which is fixed to shaft 406. The rotation of shaft 406 causes machine head drive shaft 500 and the gear 523 fixed thereto to rotate. This in turn causes the rotation of idler gears 524 and 525. Idler gear 524 then causes driven gears 526 and 527 to rotate in the same direction. The rotation of idler gear 525 causes driven gear 530 to rotate in the same direction as gears 526 and 527. These gears drive their respective output shafts 534, 541, and 542. The rotation of these output shafts causes the rotation of spindle drive shaft 580 of each boring pot 577. Finally, the rotation of shaft 580 causes the rotation of the machine tools mounted at the end of boring pot 577 in known manner.

Pallet 32 and pallet locating, securing and rotating mechanism 220 are driven towards machining cell 350 by a ball screw electric drive 651 of known type. As pallet 32 approaches machining cell 350, alignment posts 154 and 155 of pallet 32 mate with the bores 575 of pallet alignment assembly 570. As pallet 32 continues to be driven towards machining cell 350, to the left as shown in FIG. 13, the alignment shafts 572 of alignment assembly 570 are forced into their respective receptacles 543 located on machine head 353. The engagement of the bores 575 of pallet alignment assembly 570 with the alignment posts 154 and 155 together with the retraction of alignment shafts 572 within machine head 353 ensures that the pallet 32 will be accurately positioned with respect to the machine head 353 during the machining operations.

As shown in FIG. 27(a), the front face of work piece 1, the right face of work piece 2 and the left face of work piece 4 are simultaneously machined by boring pots 652, 653 and 654, respectively. These machining operations are carried out by moving pallet 32 and its accompanying work pieces towards machining cell 350 while machining cell 350 remains stationary.

After the first machining operation as described above and shown in FIG. 27(a) has been completed, the pallet 32 is backed away from machining cell 350 by ball screw electric drive 651. When the pallet 32 has been retracted a sufficient predetermined amount, the pallet 32 is rotated 90° counterclockwise as shown in FIG. 27(b), thus presenting the front face of work piece 2, the right face of work piece 3 and the left face of work piece 1 for machining. The finish marks shown on the work pieces in FIGS. 27 and 28 indicate those faces of the work pieces which have been or are being machined. Pallet 32 is then driven by ball screw electric drive 651 towards the boring pots 652, 653 and 654 of machine head 353 as described above so that the unmachined faces of the work pieces which are presented to the tools can now be machined. The sequence of backing the pallet up sufficiently so as to disengage the alignment posts 154 and 155 from the bores 575 of pallet alignment assembly 570 and then rotating pallet 32 90° so as to present additional unmachined faces of the work pieces 100 is continued two more times as shown in FIGS. 27(c) and 27(d) until the left, right and center faces of all four work pieces have been machined.

This procedure of moving the pallet towards the machining cell allows the replacement of the machine head 353 which is located on the replacement side 378 of drive turret 352 while the machine head 353 located on the spindle drive side 377 machines the work pieces located on pallet 32.

At this point, pallet 32 can be transferred down section 42 of track 31 towards the second machining station 35 or, as shown in FIG. 28, drive turret 352 can be rotated 90°, thus presenting another machine head 353 with different machine tools mounted on its boring pots 655, 656 and 657 to the spindle drive side 377 of machining cell 350. As a result, the same sequence of machining certain faces of the work pieces and then rotating the pallet 32 and repeating the machining operations can be carried out while utilizing different tools and thus performing different machining operations. As shown in FIG. 28, the machining and pallet rotation sequence of FIG. 28 is identical to that shown in FIG. 27. Upon completion of the machining and rotation sequence shown in FIG. 28(d), the left, right and center faces of each work piece could have had a plurality of machining operations performed thereon.

As discussed above, pallet locating, securing and rotation mechanism 220 and the pallet 32 mounted thereon can be driven by the ball screw electric drive 652 back to its original location located along section 42 of track 31 whereat pallet 32 can then be transferred towards second machining cell and unloading station 34, or in the alternative, drive turret 352 can be rotated 90° again in order to present additional machine heads 353 to spindle drive side 377 of drive turret 352. This sequence as described above can be repeated as many times as desired in order to machine the work pieces to the desired predetermined shape. If it would improve productivity, some of the machining operations could be performed at the first machining station and the remaining operations at the second or additional stations.

As stated above, pallet locating, securing and rotating mechanism 220 is used to rotate pallet 32. This is accomplished by forcing hydraulic fluid through vertical channel 344 in center column 224 and into the upper section 274 of cavity 272. Fluid within upper cavity 274 forces second sub-assembly 222 upward with respect to first sub-assembly 221 until the lower edge of the top portion 267 of bore 261 contacts the lower surface of piston 241. By raising second sub-assembly 222, upper half 330 of curvic coupling 323 which is mounted thereon disengages its lower half 322. As a result, second sub-assembly 222 is free to rotate with respect to first sub-assembly 221. Motor 256 is then energized so as to rotate worm 253 in the desired direction the desired number of rotations in order to rotate worm gear 266 90°. Although second sub-assembly 222 has moved upward with respect to first sub-assembly 221, second sub-assembly 222 is still rotated by worm gear 266 because the external splines located on the lower portion 263 of base 260 engage the splined interior 264 of gear hub 265 which is fixed to worm gear 266.

Once the worm gear 266 and the second sub-assembly 222 have been rotated 90°, hydraulic fluid is no longer forced through channel 334 into cavity 272 above piston 241 but rather forced through channels 335 and 336 and into cavity 272 below piston 241. This forces hydraulic fluid from cavity 272 above piston 241 which forces second sub-assembly 222 downward with respect to first sub-assembly 221. Second sub-assembly is forced downward until the upper half 330 of curvic coupling 323 contacts and engages its lower half 322.

Turret 352 is locked in position on base 351 at all times except during turret 352 rotation by maintaining hydraulic cylinders 376 in an extended position. This maintains yoke 382 in an elevated position which, in turn, maintains the outside ends of levers 386 in their raised position. The eccentric portions 388 of shafts 385 are constructed and arranged such that when the outer ends of levers 386 are elevated, the lower horizontal surfaces of the shoes 471 mounted on the eccentric portions engage the lower horizontal surface of their respective lower notches 472 in order to force posts 371 downward. This forces the upper horizontal faces 374 of upper notches 373 down onto the top outer edge 375 of ring gear 364 in order to secure turret 352 to base 351.

In order to rotate turret 352, hydraulic cylinders 376 are retracted to lower yoke 382. This lowers the outer ends of levers 386 which causes shafts 385 and the eccentric portions 388 thereof to rotate. The rotation of the eccentric portions causes the shoes 471 mounted thereon to move upwards while sliding in lower notches 472 so that the upper horizontal surfaces of shoes 471 engage the upper horizontal surface of their respective lower notches 472 in posts 371. This forces the posts 371 upward and disengages the upper horizontal faces 374 of upper notches 373 from the top outer edge 375 of ring gear 364. Air is then forced through channels (not shown) in drive turret 352 into annular channel 367 located in the bottom surface 370 of ring gear 364. The air is forced at a sufficient predetermined pressure so as to raise drive turret 352 up off the upper surface 366 of base 351. This, in effect, creates an air bearing between the drive turret 352 and the base 351 so that turret 352 can be easily rotated.

While the clamping posts 371 are releasing the ring gear 364 and air is forced into channel 367, hydraulic cylinder 427 of turret alignment assembly 424 is retracted forcing shaft 478 and the bar 431 attached thereto upward. The tapered lower portion 434 of bar 431 is raised a predetermined amount so that tapered lower end 434 of bar 431 is above tapered alignment blocks 442 which are securely fixed in the top surface 444 of each vertical face of drive turret 352.

Turret rotation motor 356 is then energized rotating its sprocket 354 which drives sprocket 356 by means of a timing belt. The rotation of sprocket 356 causes the rotation of shaft 360 and the spur gear 363 mounted thereon. This spur gear 363 engages and drives ring gear 364 which is securely mounted to drive turret 352. The main computer 650 determine the number of motor revolutions required to rotate the drive turret 352 90° and monitors the motor rotation with encoder 357.

After the drive turret has been rotated 90° to its approximate position, power to motor 356 is terminated so that ring gear 364, spur gear 363 and its accompanying shaft and sprocket and motor 356 are free to rotate while the turret 352 is being precisely aligned. In order to carry out this precise alignment, hydraulic cylinder 427 of turret alignment assembly 424 is extended forcing rod 478 and its accompanying bar 431 downward. The lower tapered surface 434 of bar 431 engages the sloped surfaces of tapered alignment blocks 442 thus precisely centering the vertical face 445 of drive turret 352 at spindle drive side 377 of machining cell 350.

Once drive turret 352 has been precisely located, air is no longer forced to the annular channel 367 of ring gear 364. Hydraulic cylinders 376 are then extended forcing clamping posts 371 downward to secure the posts to the top of the ring gear as described above. As a result, ring gear 364 and drive turret 352 are accurately secured to the upper surface 366 of base 351.

While drive turret 352 is being rotated, keyway 507 of each machine head drive shaft 500 slides on and is maintained in a horizontal position by the substantially continuous circular horizontal key which is formed by keys 416, 417 and 420 and drive key 414. In the alternative, the bolt 516 in opening 458 of each face 445 of drive turret 352 could be deleted thus allowing the rectangular stop 512, which is used to keep the keyway 507 horizontal when a machine head 353 is removed from the drive turret 352, to engage either of the notches 511 located in the inner face 510 of machine head drive shaft 500 and maintain the keyway 507 in a horizontal position. The stop 512 could be selectively disengaged from notches 511 by a cylinder and plunger mechanism mounted on the spindle drive side 377 of fixed center column 407 which would allow machine head drive shaft 500 to rotate only when keyway 507 of drive shaft 500 engages key 414 of spindle drive shaft 406.

As stated above, drive turret 352 and its accompanying machine heads 353 remain stationary during the machining operations. As a result, the machine head 353 located at the machine head replacement side 378 of machining cell 350 can be replaced during the machining operations.

In order to replace a machine head 353, sub-frame 616 of machine head replacement mechanism 615 is driven by its motor (not shown) so that the channels 630 on carriage 620 are aligned with the cam followers 550 of the machine head 353 to be replaced. Motor 625 is then energized which causes the rotation of sprocket 626 and threaded shaft 624. Because threaded collar 632 is securely mounted to carriage 620, rotation of the motor 625 in the desired direction drives carriage 620 towards machine head 353. Carriage 620 is slid towards the machine head 353 until the cam followers 550 located on the inner sides 551 of each arm 547 of machine head 353 slide into channels 630 which are supported on the outer sides of carriage 620. Carriage 620 continues towards the center of machining cell 350 until the hydraulic cylinder 633 and its accompanying post 634 line up with notch 563 in the machine head bracket 553 of machine head 353. The hydraulic cylinder is then extended forcing the post downward into engagement with the notch.

While the post is in locking engagement with notch 563, machine head release assembly 425 is actuated to release machine head 353. The retraction of hydraulic cylinder 446 forces rod 447 and cross-head 452 upward. Upwardly facing horizontal ledges 457 on the ends of cross-head 452 make contact with the upper horizontal faces 465 of notches 456 in posts 455 so as to force posts 455 upwards. This disengages the slanted portion 467 of each post 455 from the notches 485 of alignment posts 481 and 482. Once the alignment posts 455 have disengaged machine head 353, motor 625 is energized so as to drive sprocket 626 and threaded shaft 624 in the opposite direction in order to back carriage 620 away from machining cell 350.

Once carriage 620 has retracted a sufficient distance from drive turret 352, the motor which drives sub-frame 616 can be actuated in order to align carriage 620 with an available opening in the machine head storage rack in order to store the machine head 353 carried on carriage 620. At the open storage area, the cam followers 550 on the outer sides 552 of arms 547 of the machine head 353 carried by carriage 620 are slid into the channels 640 which face into each machine head storage area. The hydraulic cylinder 633 mounted on carriage 620 is then retracted in order to raise the accompanying post 634 and disengage the post from notch 563 in machine head bracket 553.

The channels 640 of the machine head storage rack and the channels 630 of carriage 620 are constructed and arranged such that the weight of machine head 353 is primarily supported by the channels 640 located in the machine head storage rack. Consequently, upon disengagement of the post 634 on carriage 620 from the notch 563 in machine head bracket 553, the machine head 353 will remain in the storage rack while the carriage 620 is retracted from the machine head storage rack.

Once carriage 620 has sufficiently cleared the machine head storage rack 38, the motor mounted to sub-frame 616 is then energized in order to drive sub-frame 616 and carriage 620 to the desired predetermined location at the machine head storage rack where the desired machine head has been stored. The carriage 620 is then driven back towards the machine head storage rack 38 so the cam rollers 550 located on the inner sides of 551 of arms 547 of machine head 353 can slide into the channels 630 located on the sides of carriage 620. Carriage 620 is driven a sufficient distance so that the cylinder 633 and post 634 mounted thereon line up with the notch 563 in machine head bracket 553 of machine head 353. The hydraulic cylinder is extended forcing the post down into engagement with notch 563. Motor 625 is then energized causing sprocket 626 and threaded shaft 624 to rotate in the desired direction so as to move the carriage 620 and accompanying machine head 353 out of the machine head storage rack 38 towards machining cell 350. Once the machining head 353 is out of the storage rack, the motor mounted on sub-frame 616 can be actuated so as to drive sub-frame 616 back into alignment with machining cell 350. Carriage 620 is then driven towards machining cell 350 until the alignment posts 481 and 482 of the machining head 353 mate with the alignment bushings 460 and 461 located on vertical face 445 of drive turret 352.

At this point hydraulic cylinder 446 of machine head replacement assembly 425 is extended and the springs within turret 352 force alignment posts 454 downward so that the slanted portion 467 of posts 455 contact the sloped inner face 490 of notches 485 and 492 in alignment posts 481 and 482. Due to the interaction between the slanted portion 467 of the posts 455 and the notches 485 and 492, machine head 353 is pulled up securely towards the outer face 445 of drive turret 352.

The contact bolts 463 located on the vertical face 445 of drive turret 352 contact the contact bolts 520 mounted on the rear face 479 of machine head 353. Air is then forced through the small axial apertures in the contact bolts 463 through the drive turret 352. If contact bolts 520 do not seal the apertures in contact bolts 463 and allow air to escape, a signal is sent by the main computer 650 to alert the operator that the machine head 353 is not properly secured.

While hydraulic cylinder 446 is being extended, the hydraulic cylinder 633 located on carriage 620 is retracted in order to force its accompanying post 634 upwards and out of engagement with notch 563 of machine head bracket 553. Motor 625 is then energized such that sprocket 626 and threaded shaft 624 rotate in the direction so as to back carriage 620 away from machining cell 350.

While the loading, unloading, and the various machining operations are occurring, pallets 32 can still be transferred around track 31. However, no pallet may pass another. In order to effectuate this non-synchronous flow of pallets the pallet shuttle mechanism 584 shown in FIGS. 23 and 24 is used. Each hydraulically controlled finger mechanism 585 is normally maintained in its upward position and is individually controllable by the main computer 650. As a result, the hydraulic cylinder 591 of each mechanism 585 can be independently actuated and thus force any combination of finger mechanisms 588 downward into the notches 193 located in the sides 177 and 180 of pallet 32.

As large hydraulic cylinder 605 is extended, frame 586 and the finger mechanisms 585 mounted thereon slide to the left as shown in FIGS. 1 and 23. Upon retraction of cylinder 605, the frame 586 and mechanisms 585 slide to the right, back to their original location. Thus, by extending only the finger mechanisms 585 located on the side of frame 586 adjacent section 40 of track 31 and then retracting cylinder 605, the desired movement of pallets 32 along section 40 is obtained. By maintaining the finger mechanisms 585 located adjacent section 42 of track 31 in their upward position during the right stroke of frame 586, the pallets 32 located on section 42 are not affected by this stroke.

After cylinder 605 has been retracted and the frame 586 and its finger mechanisms 585 are at their extreme right position, all of the finger mechanisms 585 adjacent section 40 of track 31 are retracted so that none of the fingers 588 still engage any of the pallets along section 40. As this occurs, the finger mechanisms 585 adjacent section 42 located above the notches 193 of the pallets 32 which are to be slid along section 42 to the left are extended to force fingers 588 into the notches 193 of the appropriate pallets. Cylinder 605 is then extended causing the desired pallets to slide along section 42 to the left and leave the pallets along section 40 uneffected. This procedure can be repeated as often as desired in order to move any number of pallets.

When pallet 32 reaches the end of section 40 and 42 it slides onto the rails 645 of the sub-frame 644 of the end transfer mechanisms 41 and 43 respectively. Upon reaching the end of the sub-frame, the pallet contacts a switch (not shown) located at the end of the track which causes the hydraulic cylinder 642 mounted to frame 606 to retract forcing the sub-frame and pallet 32 to slide from the end of section 4 or 42 to the adjacent beginning of the other section 42 or 40. Upon arrival at the other section, the rails 645 mounted on the sub-frame 644 line up with the rails 49 of the other section and, if space is available, pallet 32 is slid onto section 42 or 40 by pallet shuttle mechanism 584. The hydraulic cylinder 642 is then activated so that the sub-frame 644 is returned to its original position.

It will be understood that the embodiments of the present invention which have been described herein are merely illustrative of an application of the principles of the invention. Modifications may be made by those skilled in the art without departing from the spirit and scope of the invention.

I claim:

1. In machining system comprising:
    a track;
    a pallet loading station juxtaposed to said track;
    a pallet unloading station juxtaposed to said track;
    at least one machining station juxtaposed to said track at a location intermediate to said loading and unloading stations;

a plurality of pallets supported for movement along said track between said loading and unloading stations and past said machining station;

means on each pallet for mounting at least one work piece in predetermined positions thereon;

means for moving said pallets on said track in a non-synchronous manner;

each said machining station including a means for locating and securing said pallets in a predetermined location at said at least one said machining station and a machining cell;

means for orienting at least one each of said pallets when located and secured in said predetermined position at said machining station in a plurality of positions whereby different surfaces of said work piece or pieces mounted thereon are selectively presented to tools on said machining cell for machining thereof; and means at each machining station for producing relative movement between said pallet and said machining cell;

wherein said locating and securing means comprises:

a base at each machining station adapted to receive said pallets one at a time;

means providing a pair of rigid locating surfaces on said base;

means providing a pair of rigid locating surfaces on said pallet; pallet;

two alignment sockets located on said pallet;

two matingly-shaped alignment pins located on said base which slidably engage said sockets;

two securing pins located on said base;

said pallet being aligned through engagement of said alignment pins and sockets respectively and being subsequently secured by the engagement of said securing pins with said pallet forcing said first rigid locating surfaces into contact with said second rigid locating surfaces.

2. The machining system of claim 1 wherein each said alignment socket having a tapered bore;

each said locating pin having a tapered tip;

each said pallet having two lips extending beneath said base;

said first locating surface comprising two parallel sections;

said second locating surface comprising two parallel sections;

said second locating sections being located on the upper faces of said lips.

3. The machining system of claim 2 wherein second locating surface comprises a plurality of contact fingers.

4. In machining system comprising:

a track;

a pallet loading station juxtaposed to said track;

a pallet unloading station juxtaposed to said track;

at least one machining station juxtaposed to said track at a location intermediate to said loading and unloading stations;

a plurality of pallets supported for movement along said track between said loading and unloading stations and past said machining station;

means on each pallet for mounting at least one work piece in predetermined positions thereon;

means for moving said pallets on said track in a non-synchronous manner;

each said machining station including a means for locating and securing said pallets in a predetermined location at said at least one said machining station and a machining cell;

means for orienting each of said pallets when located and secured in said predetermined position at said at least one said machining station in a plurality of positions whereby different surfaces of said work piece or pieces mounted thereon are selectively presented to tools on said machining cell for machining thereof; and means at each machining station for producing relative movement between said pallet and said machining cell;

wherein said machining cell comprises:

a turret comprising a rotatable support;

a plurality of machine heads having tools mounted in spaced relationship on said rotatable support;

means for rotating said support so as to position said machine heads one at a time whereby said work pieces can be presented to said tools thereon;

at least one spindle rotatably mounted on each said machine head;

means for driving each said spindle when its associated machine head has a work piece presented thereto; and means for changing said machine heads comprising;

a first frame means;

a second frame means;

means for moving said first frame means relative to said second frame means;

means for carrying said machine heads;

said carrying means comprising a first component fixed to each said machine head and a second component slidably mounted on said second frame means;

means for releasably securing each said machining head to said carrying means; and means for storing said machine heads on said first frame means.

5. In machining system comprising:

a track;

a pallet loading station juxtaposed to said track;

a pallet unloading station juxtaposed to said track;

at least one machining station juxtaposed to said track at a location intermediate to said loading and unloading stations;

a plurality of pallets supported for movement along said track between said loading and unloading stations and past said machining station;

means on each pallet for mounting at least one work piece in predetermined positions thereon;

means for moving said pallets on said track in a non-synchronous manner;

each said machining station including a means for locating and securing said pallets in a predetermined location at said at least one said machining station and a machining cell;

means for orienting each of said pallets when located and secured in said predetermined position at said at least one said machining station in a plurality of positions whereby different surfaces of said work piece or pieces mounted thereon are selectively presented to tools on said machining cell for machining thereof; and means at each machining station for producing relative movement between said pallet and said machining cell;

wherein said machining cell comprises:

a turret comprising a rotatable support;

a plurality of machine heads having tools mounted in spaced relationship on said rotatable support;

means for rotating said support so as to position said machine heads one at a time whereby said work pieces can be presented to said tools thereon;

at least one spindle rotatably mounted on each said machine head; its means for driving each said spindle when associated machine head has a work piece presented thereto; and wherein said rotatable support is a housing and said machine heads are mounted on different sides thereof; and said means for rotating said rotatable support comprises:

a first gear fixed to said housing, a second gear in mesh with said first gear, and a motor connected in operative driving relationship with said second gear.

6. In machining system comprising:

a track;

a pallet loading station juxtaposed to said track;

a pallet unloading station juxtaposed to said track;

at least one machining station juxtaposed to said track at a location intermediate to said loading and unloading stations;

a plurality of pallets supported for movement along said track between said loading and unloading stations and past said machining station;

means on each pallet for mounting at least one work piece in predetermined positions thereon;

means for moving said pallets on said track in a non-synchronous manner;

each said machining station including a means for locating and securing said pallets in a predetermined location at said at least one said machining station and a machining cell;

means for orienting each of said pallets when located and secured in said predetermined position at said at least one said machining station in a plurality of positions whereby different surfaces of said work piece or pieces mounted thereon are selectively presented to tools on said machining cell for machining thereof; and means at each machining station for producing relative movement between said pallet and said machining cell;

wherein said machining cell comprises:

a turret comprising a rotatable support;

a plurality of machine heads having tools mounted in spaced relationship on said rotatable support;

means for rotating said support so as to position said machine heads one at a time whereby said work pieces can be presented to said tools thereon;

at least one spindle rotatably mounted on each said machine head;

means for driving each said spindle when its associated machine head has a work piece presented thereto; and means for releasably mounting said machine heads on said rotatable support comprising;

at least one machine head mating face on said rotatable support;

a rotatable support mating face on each said machine head;

one of said rotatable support or said machining having at least one alignment bore opening into said machine head mating face or said rotatable support mating face, respectively;

the other of said rotatable support or said machine head having a mating alignment pin rigidly projecting from its said mating face in registration with one said alignment bore;

said alignment pin having a transverse notch with one wedge-shaped sidewall;

said rotatable support or said machine head having said at least one alignment bore also having an anchor pin projecting into each said alignment bore and reciprocably mounted for removal therefrom;

each said anchor pin having one wedge-shaped end; and wherein said wedge-shaped end of each said anchor pin engages said wedge-shaped sidewall of said transverse notch forcing said machine head mating face into contact with said rotatable support mating face.

7. In machining system comprising:

a track;

a pallet loading station juxtaposed to said track;

a pallet unloading station juxtaposed to said track;

at least one machining station juxtaposed to said track at a location intermediate to said loading and unloading stations;

a plurality of pallets supported for movement along said track between said loading and unloading stations and past said machining station;

means on each pallet for mounting at least one work piece in predetermined positions thereon;

means for moving said pallets on said track in a non-synchronous manner;

each said machining station including a means for locating and securing said pallets in a predetermined location at said at least one said machining station and a machining cell;

means for orienting each of said pallets when located and secured in said predetermined position at said at least one said machining station in a plurality of positions whereby different surfaces of said work piece or pieces mounted thereon are selectively presented to tools on said machining cell for machining thereof; and means at each machining station for producing relative movement between said pallet and said machining cell;

wherein said pallet moving means comprises:

frame means;

means mounted on said frame means for selectively engaging and moving said pallets therewith to desired locations on said track;

means for reciprocating said frame means and engaging means mounted thereon between a first position and a second position with respect to said track.

8. The machining system of claim 7 wherein said engagement means comprise:

a plurality of independently controlled cylinders;

each cylinder reciprocating a contact mechanism between an attachment position with said pallet and a by-pass position.

* * * * *